(12) United States Patent
Farrar et al.

(10) Patent No.: US 12,377,796 B2
(45) Date of Patent: Aug. 5, 2025

(54) GRAPHENE-BASED ANTIVIRAL POLYMER

(71) Applicant: CpK Interior Products Inc., Port Hope (CA)

(72) Inventors: Gregory James Farrar, Roblin (CA); Murali Mohan Reddy, Belleville (CA)

(73) Assignee: CPK Interior Products Inc., Port Hope (CA)

( * ) Notice: Subject to any disclaimer, the term of this patent is extended or adjusted under 35 U.S.C. 154(b) by 0 days.

(21) Appl. No.: 18/386,669

(22) Filed: Nov. 3, 2023

(65) Prior Publication Data

US 2024/0059231 A1  Feb. 22, 2024

Related U.S. Application Data

(63) Continuation of application No. 17/411,415, filed on Aug. 25, 2021, now Pat. No. 11,878,635.

(Continued)

(51) Int. Cl.
*B60R 13/02* (2006.01)
*A01N 25/10* (2006.01)
(Continued)

(52) U.S. Cl.
CPC .............. *B60R 13/02* (2013.01); *A01N 25/10* (2013.01); *A01N 59/00* (2013.01); *A01N 59/16* (2013.01); *A01N 59/20* (2013.01); *B32B 5/18* (2013.01); *B32B 27/065* (2013.01); *B32B 27/18* (2013.01); *B32B 27/304* (2013.01); *B32B 1/08* (2013.01); *B32B 2264/102* (2013.01); *B32B 2264/108* (2013.01); *B32B 2307/546* (2013.01); *B32B 2307/7145* (2013.01); *B32B 2419/04* (2013.01);
(Continued)

(58) Field of Classification Search
CPC   B60R 13/02; B32B 5/18; B32B 27/06; B32B 27/18; B32B 27/30; A01N 59/00; A01N 59/20; A01N 25/10; A01N 59/16
USPC .......................................................... 428/99
See application file for complete search history.

(56) References Cited

U.S. PATENT DOCUMENTS 5,580,501 A   12/1996 Gallagher et al.
5,824,738 A   10/1998 Humphrey et al.
(Continued)

FOREIGN PATENT DOCUMENTS

CN        106065308 A      11/2016
CN        108059819 A   *   5/2018
(Continued)

OTHER PUBLICATIONS

Machine_English_translation_CN_108059819_A; He, Jianxiong; TPU material having low density; May 22, 2018; EPO; whole document (Year: 2024).*

(Continued)

*Primary Examiner* — Tahseen Khan
(74) *Attorney, Agent, or Firm* — Harness, Dickey & Pierce PLC

(57) ABSTRACT

An antiviral material is provided. The antiviral material includes a polymeric matrix and graphene particles dispersed in the polymeric matrix at a concentration of greater than or equal to about 0.05 wt. % to less than or equal to about 10 wt. % based on the total weight of the antiviral material, wherein the antiviral material exhibits antiviral activity. Methods of making the antiviral material and uses of the antiviral material are also provided.

48 Claims, 16 Drawing Sheets

Related U.S. Application Data

(60) Provisional application No. 63/080,417, filed on Sep. 18, 2020.

(51) Int. Cl.

| | |
|---|---|
| *A01N 59/00* | (2006.01) |
| *A01N 59/16* | (2006.01) |
| *A01N 59/20* | (2006.01) |
| *B32B 5/18* | (2006.01) |
| *B32B 27/06* | (2006.01) |
| *B32B 27/18* | (2006.01) |
| *B32B 27/30* | (2006.01) |
| *B32B 1/08* | (2006.01) |
| *B60J 3/02* | (2006.01) |
| *B60N 2/58* | (2006.01) |
| *B60R 7/04* | (2006.01) |
| *B60R 21/215* | (2011.01) |
| *B62D 25/04* | (2006.01) |

(52) U.S. Cl.
CPC ....... *B32B 2457/00* (2013.01); *B32B 2471/04* (2013.01); *B32B 2479/00* (2013.01); *B32B 2597/00* (2013.01); *B32B 2605/003* (2013.01); *B32B 2605/08* (2013.01); *B60J 3/0204* (2013.01); *B60N 2/58* (2013.01); *B60R 7/04* (2013.01); *B60R 13/0243* (2013.01); *B60R 21/215* (2013.01); *B62D 25/04* (2013.01)

(56) References Cited

U.S. PATENT DOCUMENTS

| | | |
|---|---|---|
| 6,346,320 B2 | 2/2002 | Doteguchi et al. |
| 6,548,600 B2 | 4/2003 | Walton |
| 6,548,960 B2 | 4/2003 | Inukai |
| 6,808,197 B2 | 10/2004 | Bauer et al. |
| 6,896,310 B1 | 5/2005 | Trappe et al. |
| 6,982,302 B2 | 1/2006 | Kanae et al. |
| 7,318,498 B2 | 1/2008 | Woodman et al. |
| 7,560,515 B2 | 7/2009 | Tansey |
| 7,571,928 B2 | 8/2009 | Soejima |
| 7,659,350 B2 | 2/2010 | Prud'Homme et al. |
| 7,732,520 B2 | 6/2010 | Onizawa et al. |
| 7,935,754 B2 | 5/2011 | Prud'Homme et al. |
| 8,066,964 B2 | 11/2011 | Prud'Homme et al. |
| 8,178,640 B2 | 5/2012 | Smith et al. |
| 8,794,661 B2 | 8/2014 | Cowelchuk et al. |
| 8,852,689 B2 | 10/2014 | Srinivas et al. |
| 9,039,938 B2 | 5/2015 | Crain et al. |
| 9,120,908 B2 | 9/2015 | Russ et al. |
| 9,334,386 B2 | 5/2016 | Alsharaeh et al. |
| 9,358,767 B2 | 6/2016 | Wisniewski et al. |
| 9,440,385 B2 | 9/2016 | Suzuki et al. |
| 9,539,745 B2 | 1/2017 | Shane |
| 9,623,827 B2 | 4/2017 | Fischer et al. |
| 9,713,972 B2 | 7/2017 | Bozio et al. |
| 9,777,171 B1 | 10/2017 | Redmond et al. |
| 9,815,897 B2 | 11/2017 | King et al. |
| 9,896,565 B2 | 2/2018 | Nosker et al. |
| 10,093,268 B2 | 10/2018 | Cowelchuk et al. |
| 10,232,755 B2 | 3/2019 | Brines et al. |
| 10,328,881 B2 | 6/2019 | Bozio et al. |
| 10,329,391 B2 | 6/2019 | Nosker et al. |
| 10,358,159 B2 | 7/2019 | Pekari |
| 10,583,591 B2 | 3/2020 | Mitsutsuji et al. |
| 2006/0045996 A1 | 3/2006 | Fujibayashi et al. |
| 2010/0227985 A1* | 9/2010 | Nishiguchi ......... C08G 18/758 525/453 |
| 2010/0291366 A1 | 11/2010 | Humphrey, Jr. et al. |
| 2011/0111151 A1* | 5/2011 | Maziers ................... B32B 5/20 428/36.5 |
| 2011/0223405 A1 | 9/2011 | Compton et al. |
| 2011/0301265 A1 | 12/2011 | Brunner et al. |
| 2015/0203657 A1 | 7/2015 | Gredegard et al. |
| 2015/0237866 A1* | 8/2015 | Goudswaard ........... C08K 3/26 424/641 |
| 2015/0360597 A1 | 12/2015 | Galbreath et al. |
| 2017/0100992 A1 | 4/2017 | Ruybal |
| 2017/0166722 A1* | 6/2017 | Zhamu ..................... C08K 3/04 |
| 2017/0240736 A1 | 8/2017 | Farrar ...................... C08K 5/11 |
| 2017/0259523 A1* | 9/2017 | Maziers .................. B32B 27/00 |
| 2018/0044536 A1 | 2/2018 | Walia et al. |
| 2018/0179357 A1 | 6/2018 | Lu et al. |
| 2019/0119463 A1 | 4/2019 | Maia et al. |
| 2019/0233611 A1 | 8/2019 | Nosker et al. |
| 2019/0344689 A1 | 11/2019 | Bailey |
| 2020/0139814 A1 | 5/2020 | Garcia et al. |
| 2021/0170730 A1 | 6/2021 | Zhao et al. |

FOREIGN PATENT DOCUMENTS

| | | |
|---|---|---|
| CN | 108517123 A | 9/2018 |
| CN | 110643117 A | 1/2020 |
| CN | 110812518 A | 2/2020 |
| CN | 111334922 A | 6/2020 |
| CN | 111501368 A | 8/2020 |
| CN | 111636147 A | 9/2020 |
| CN | 111910443 A | 11/2020 |
| CN | 112898692 A | 6/2021 |
| EP | 3871926 A1 | 9/2021 |
| EP | 3970489 A1 | 3/2022 |
| JP | H01191454 A | 8/1989 |
| JP | 2000301623 A | 10/2000 |
| JP | 2003155223 A | 5/2003 |
| JP | 2004352179 A | 12/2004 |
| JP | 4082279 B2 | 4/2008 |
| JP | 2015509474 A | 3/2015 |
| JP | 2015198496 A | 11/2015 |
| JP | 6021946 B2 | 11/2016 |
| JP | 2017071106 A | 4/2017 |
| JP | 2017521576 A | 8/2017 |
| JP | 2018078284 A | 5/2018 |
| JP | 2018178117 A | 11/2018 |
| JP | 6574669 B2 | 9/2019 |
| JP | 2019155292 A | 9/2019 |
| KR | 20090077005 A | 7/2009 |
| KR | 20140005684 A | 1/2014 |
| KR | 101401757 B1 | 6/2014 |
| WO | 2009072299 A1 | 6/2009 |
| WO | 2015064708 A1 | 5/2015 |
| WO | 2017170160 A1 | 10/2017 |
| WO | 2022125868 A2 | 6/2022 |

OTHER PUBLICATIONS

Matharu, R.; et al.; Viral Filtration using Carbon-Based Materials; Jun. 11, 2020; Wiley; whole document (Year: 2024) (Year: 2024).*

Indrant Das Jana et al.; Development of a copper-graphene nanocomposite based transparent coating with antiviral activity against influenza virus; Sep. 20, 2020; bioRxiv Cold Spring Harbor Laboratory; whole document (Year: 2020) (Year: 2024).*

"COVID-19 Anti-viral Zinc Oxide ZnO Film," p. 1-7 (Sep. 3, 2020).

Behzadinasab, S., et al., "A Surface Coating that Rapidly Inactivates SARS-COV-2," Applied Material Material & Interfaces, vol. 12, No. 31, p. 34723 (Aug. 5, 2020).

Chinese 1st Office Action corresponding to CN202111032816.9, Dated Oct. 26, 2022.

Chinese 2nd Office Action corresponding to CN202111032816.9, Dated May 10, 2023.

Chinese 3rd Office Action corresponding to CN202111032816.9, Dated Sep. 26, 2023.

Chinese Search Report corresponding to CN202111032816.9, Dated Oct. 20, 2022.

Cortes, A., et al., "The use of copper to help prevent transmission of SARS-coronavirus and influenza. A general review," Diagnostic Microbiology and Infectious Disease, Elsevier, Amsterdam, NL, vol. 98, No. 4, (Aug. 15, 2020).

European Search Report, Munich (Jan. 13, 2022).

(56) References Cited

OTHER PUBLICATIONS

Intention to Grant, European Patent Office (Mar. 12, 2021).
Japan-Notice of Reasons for Refusal, corresponding to Japanese Patent Application No. 2021-152062, Date of Drafting: Mar. 6, 2023.
Japanese Office Action regarding Application No. 2021-103785 date of drafting Jul. 4, 2022.
Japanese Office Action regarding Application No. 2021-103785 date of drafting Sep. 2, 2022.
Indrani Das Jana et. al.; Development of a copper-graphene nanocomposite based transparent coating with antiviral activity against influenza virus; Sep. 2, 2020; bioRxiv Cold Spring Harbor Laboratory; whole document (Year: 2020).
Matharu, R., et al., "Viral filtration using carbon-based materials," Medical Devices & Sensors, vol. 3, No. 4, (Jul. 12, 2020).
Revels, M., "Former student's company creates antiviral material for masks," Texas A&M University Enginering, (Sep. 3, 2020).
Stankovich et al., "Graphene-based composite materials," Nature vol. 442, Jul. 20, 2006.
Wang Gang, et al., Graphene: Material Revolution in the 21st Century, China Science and Technology Press, 1st edition, first printed in Apr. 2021, p. 085, published on Apr. 30, 2021.
Professor Mohan Edirisinghe, DSc, "Microstructure and Antibacterial Efficacy of Graphene Oxide Nanocomposite Fibres", Elsevier Editorial System(tm) for Journal of Collid and Interface Science, JCIS-20-377R2, E. Biomaterials and Nanomedicine, 112 pages.
Decision of Reexamination received by the Chinese Patent Office related to Chinese Patent Application No. 202111032816.9 dated Oct. 29, 2024.
Communication pursuant to Article 94(3) EPC received by the European Patent Office related to European Patent Application No. EP21189750.9 dated Mar. 13, 2025, 5 pages.

\* cited by examiner

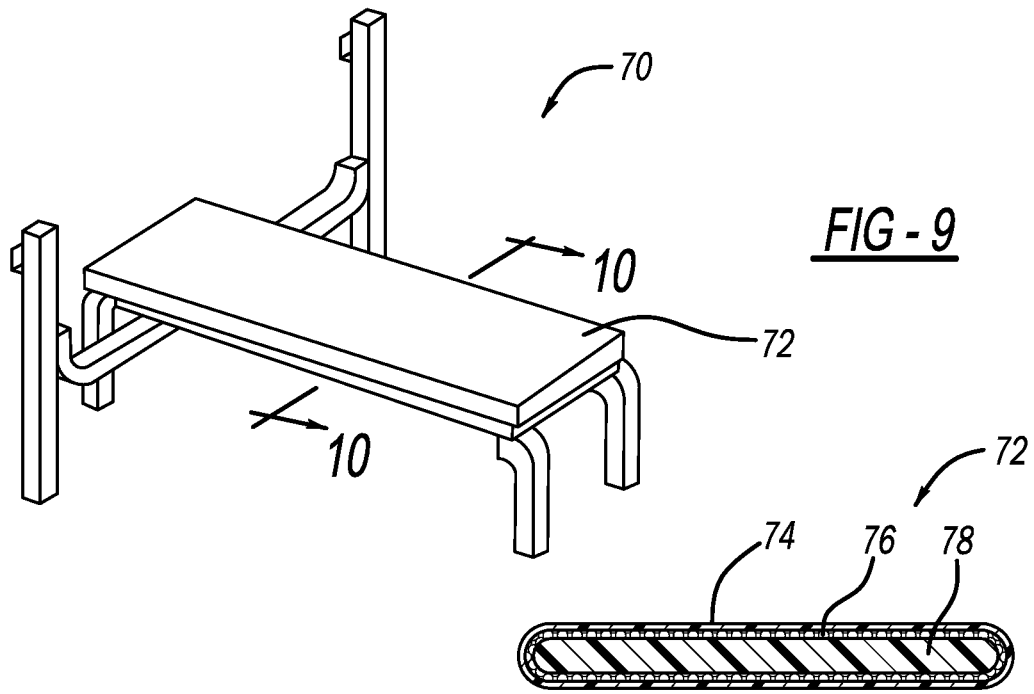
*FIG - 9*
*FIG - 10*
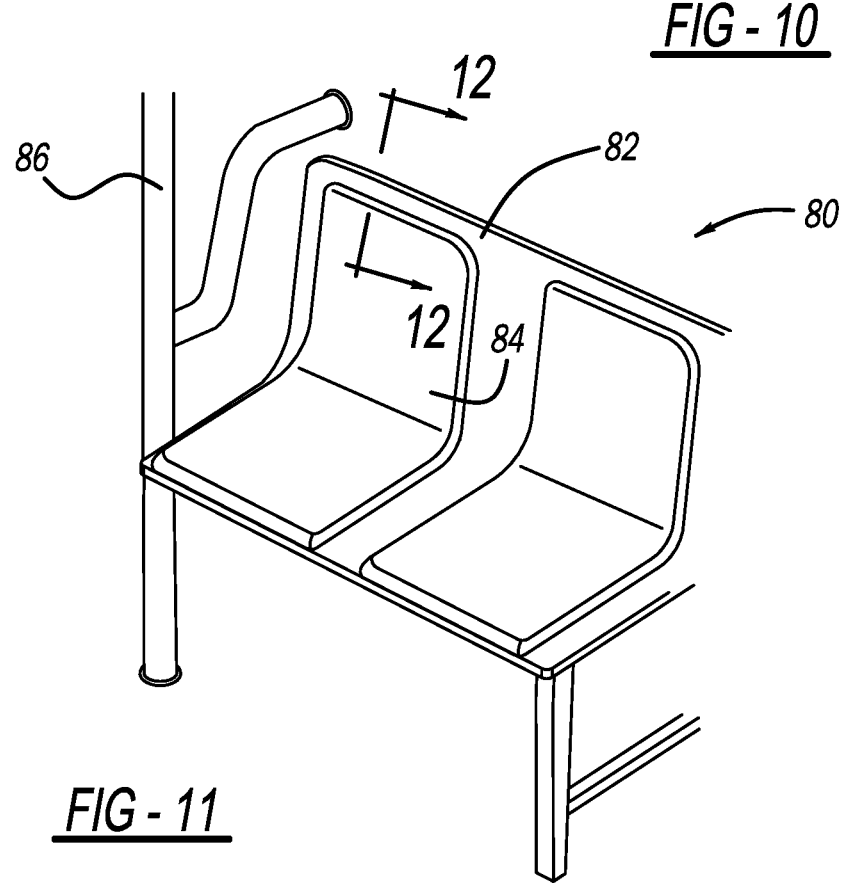
*FIG - 11*

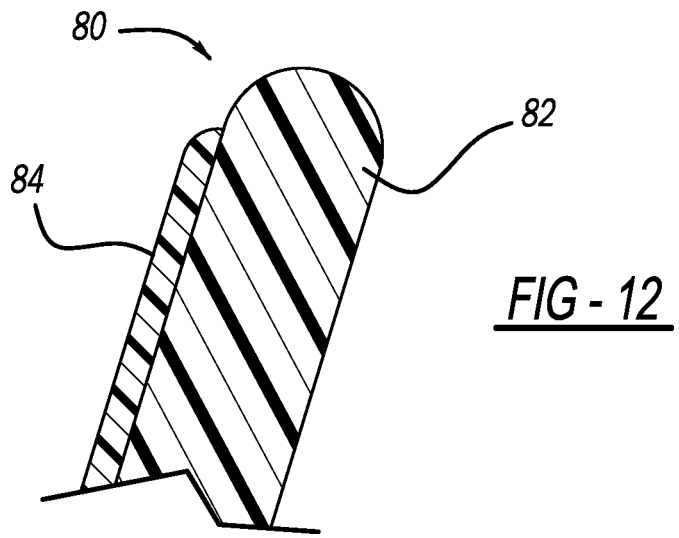
*FIG - 12*
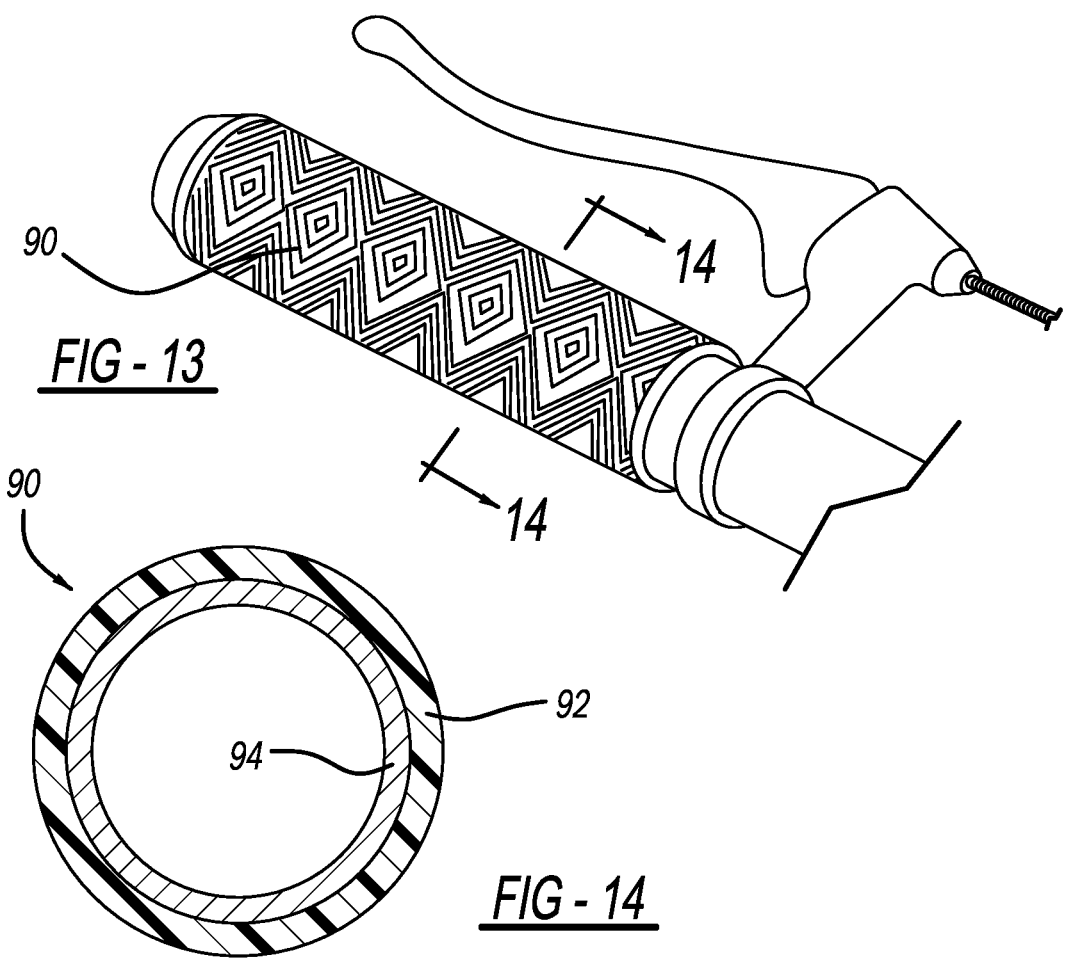
*FIG - 13*
*FIG - 14*

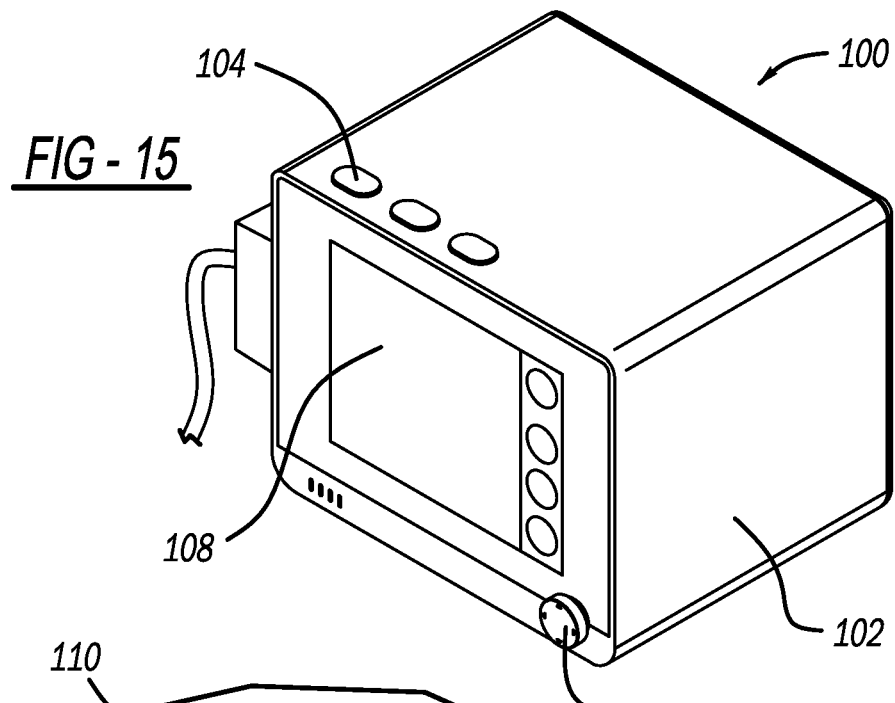
FIG - 15
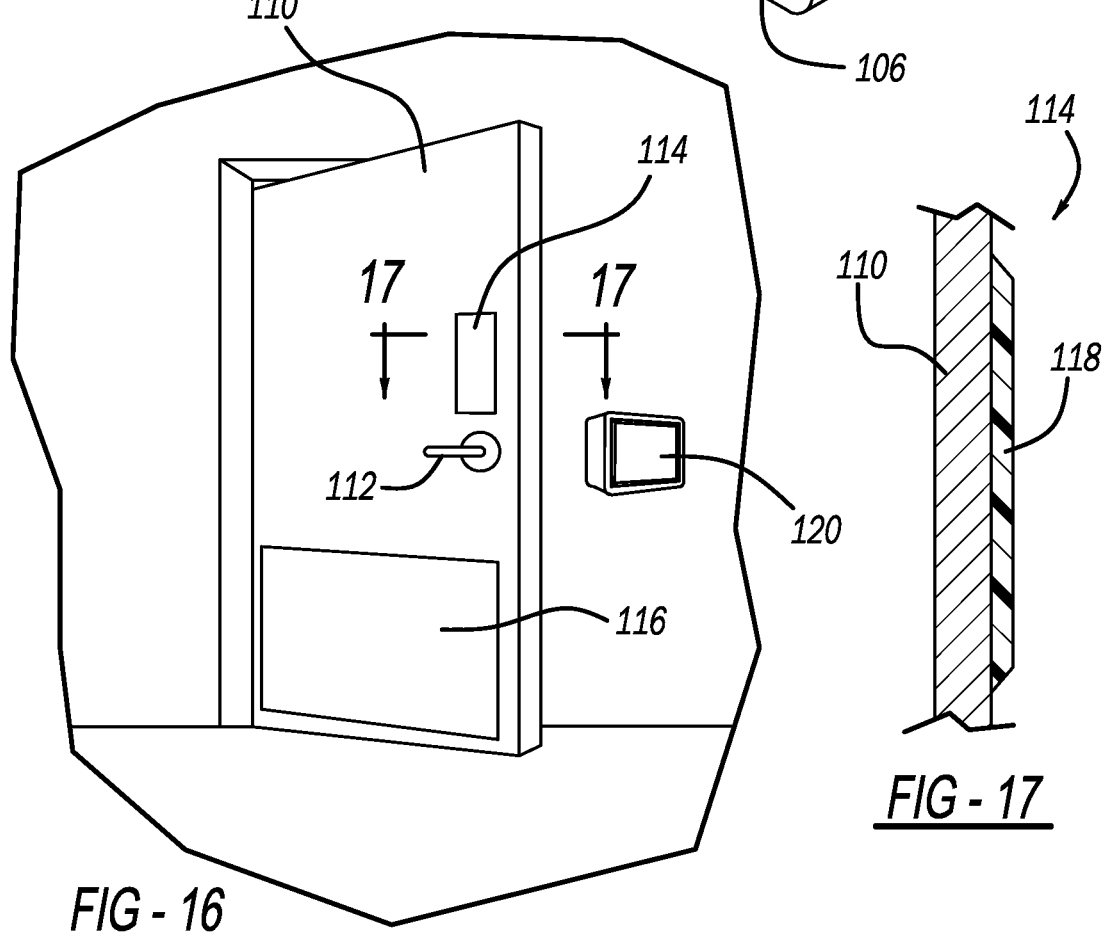
FIG - 16
FIG - 17

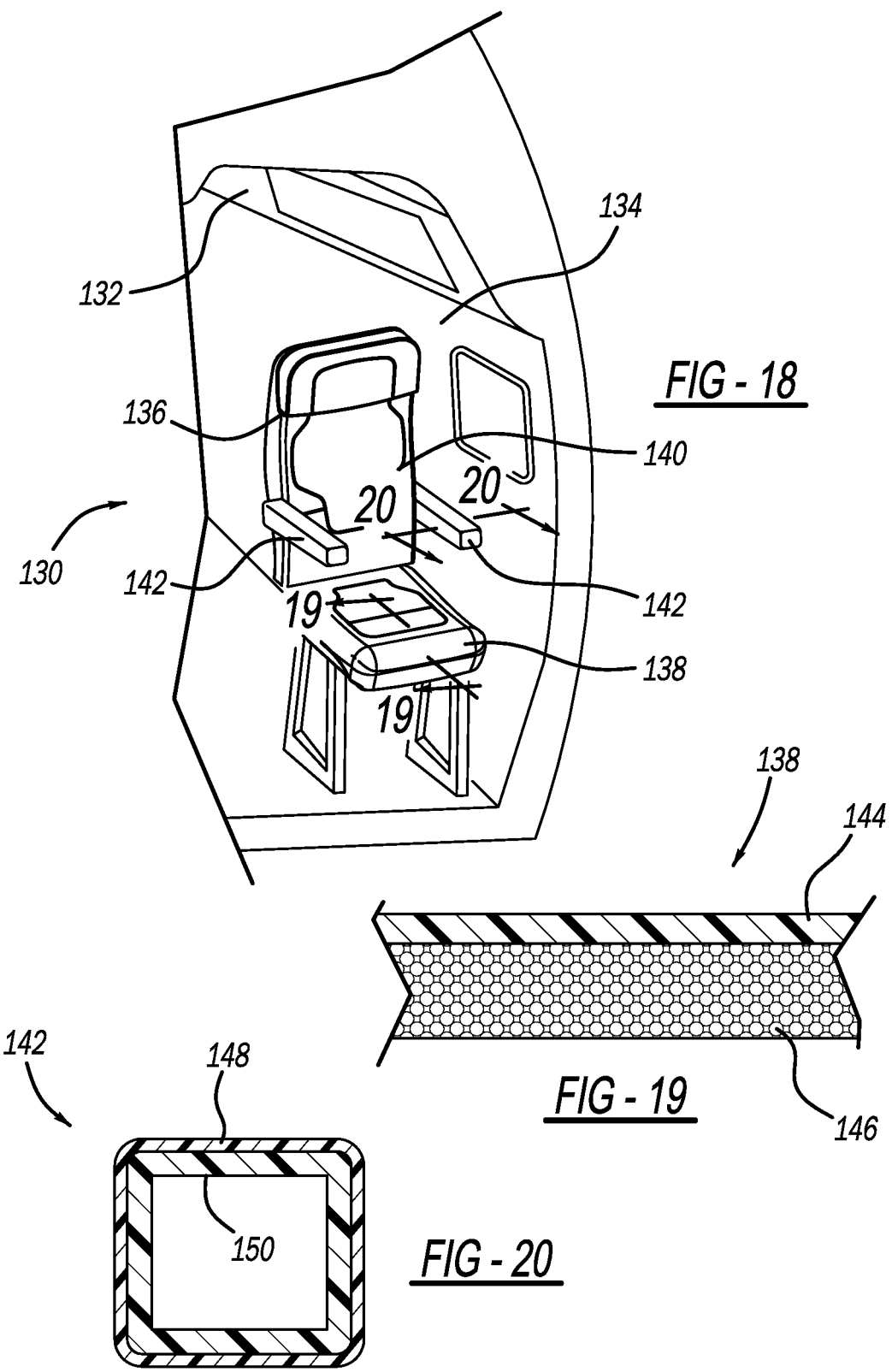

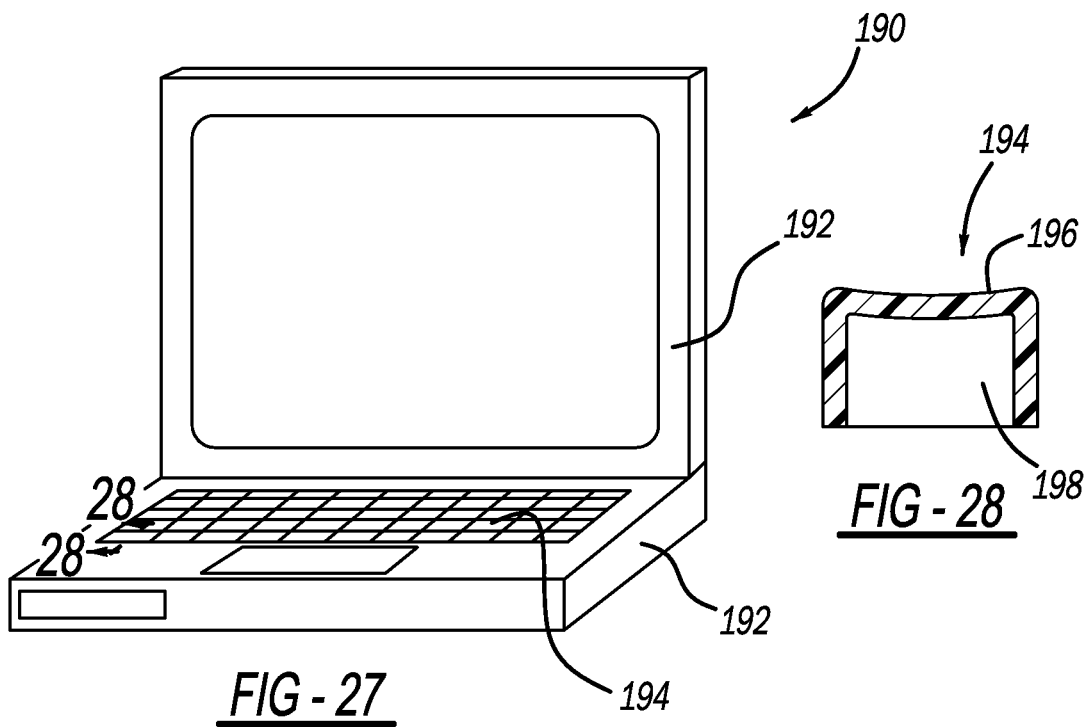
FIG - 27
FIG - 28
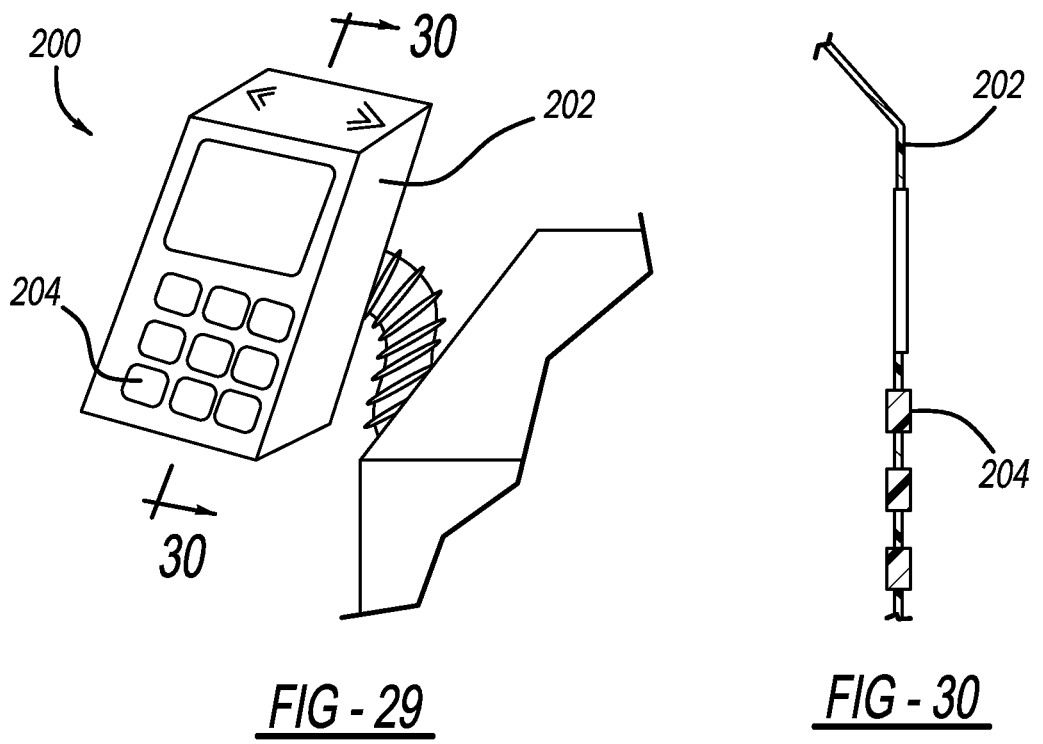
FIG - 29
FIG - 30

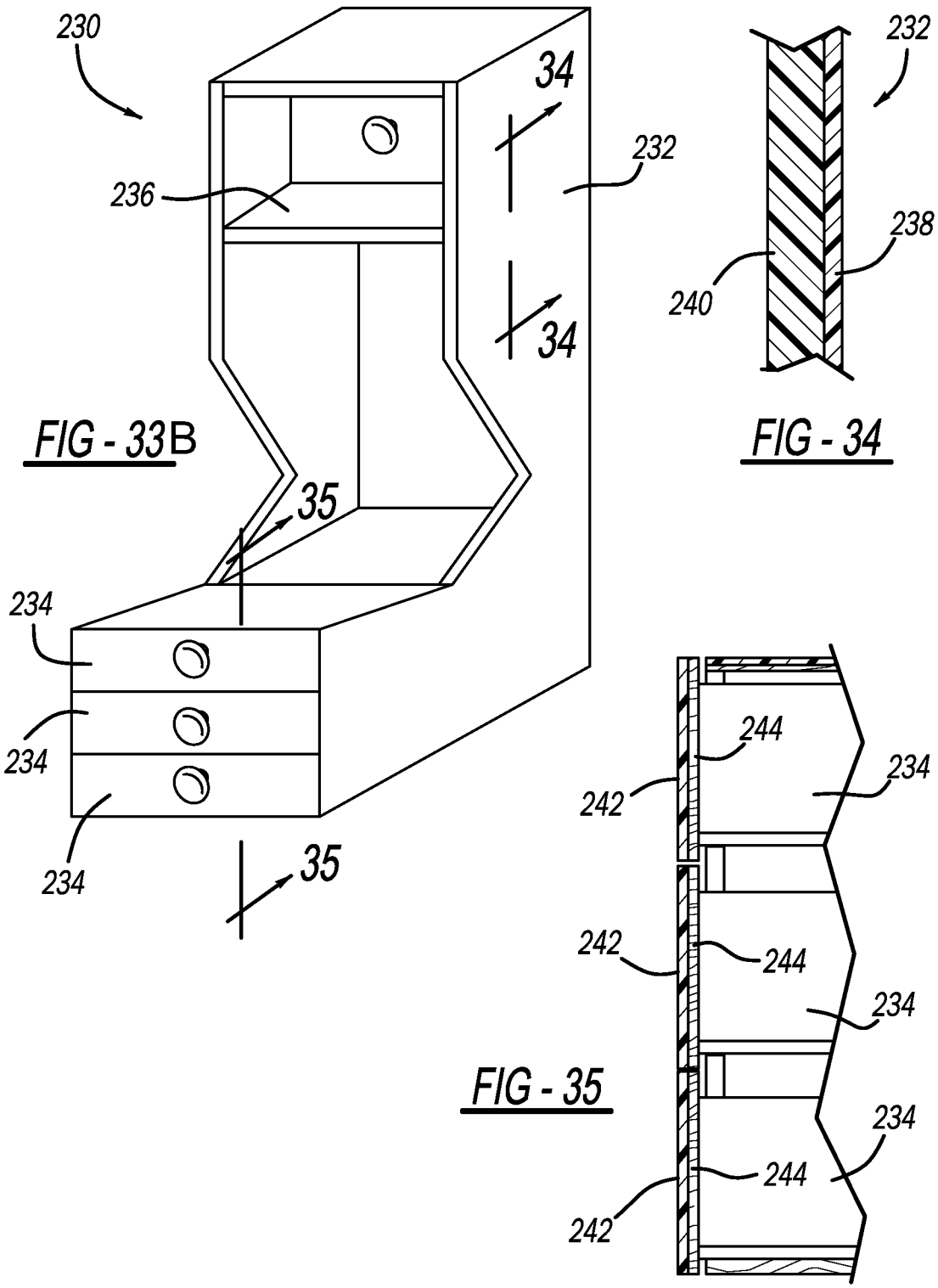

GRAPHENE-BASED ANTIVIRAL POLYMER

CROSS REFERENCE TO RELATED APPLICATION

This application is a continuation of U.S. patent application Ser. No. 17/411,415, filed on Aug. 25, 2021, which claims the benefit of U.S. Provisional Application Ser. No. 63/080,417, filed on Sep. 18, 2020, all of which are incorporated by reference herein.

FIELD

The present disclosure relates to polymeric materials including antimicrobial particles that are suitable for high touch surfaces.

BACKGROUND AND SUMMARY

The present application generally pertains to antimicrobial materials and, more particularly, to antiviral materials that inactivate or destroy coronaviruses.

Severe acute respiratory syndrome coronavirus 2 (SARS-CoV-2) epidemic has changed the way hygiene is managed and maintained in public and other shared spaces. SARS-CoV-2, which causes coronavirus disease 2019 (COVID-19), and other deadly microbes can transmit through direct person-to person contact, from the uptake of contaminated airborne droplets, or even from contact with contaminated surfaces such as vehicle interiors. The use of antiviral materials is an effective way to inactivate viral particles in the environment, which prevents viral transmission, thus lowering the risk of infection.

Polymers are ubiquitous materials found on many public and shared spaces. Polymers have many applications in disposable cutleries, cars, aircrafts, cruise ships, and stadiums. A shared economy has led to a growth of multiple users using the same vehicle at different times. Rental cars and other shared vehicles are affected by SARS-Covid-2, as the virus can be easily transmitted by coming in contact with it. Therefore, antiviral polymeric materials that can significantly diminish the amount of virus present on surfaces over time are desired.

In accordance with the present invention, an antimicrobial material is provided. The antimicrobial material has antiviral activity and includes a polymeric matrix and graphene particles dispersed in the polymeric matrix at a concentration of greater than or equal to about 0.05 wt. % to less than or equal to about 10 wt. % based on the total weight of the antiviral material. In a further aspect, the antimicrobial material includes metal oxide particles dispersed in the polymer matrix, the metal oxide particles including at least one of cuprous oxide ($Cu_2O$) particles or zinc oxide (ZnO) particles. In another aspect, the antiviral material is flexible and the polymeric matrix includes a polymer including flexible and/or rigid polyvinyl chloride (PVC), a thermoplastic elastomer (TPE), or a combination thereof, wherein the TPE includes a thermoplastic polyurethane (TPU), a thermoplastic polyolefin (TPO), thermoplastic vulcanizates (TPV), or combinations thereof. In yet another aspect, the antiviral material is rigid and the polymeric matrix includes a polymer including polypropylene (PP), acrylonitrile butadiene styrene (ABS), polycarbonate (PC), PC/ABS, PC/PP, a thermoplastic elastomer (TPE), or combinations thereof.

The antimicrobial material is useful as a surface of an automotive vehicle selected from the group consisting of an A-pillar, a B-pillar, a C-pillar, an instrument panel, a steering wheel skin, an airbag cover, a door trim panel, a center console, a knee bolster, a seat mechanism cover, and a sun visor. The antimicrobial material is also useful in non-automotive vehicle applications, such as for a seat, a bench, an exercise bench, a bicycle handle, a motorcycle handle, a vital signs monitor, hospital equipment, a door hand panel, a door foot panel, a door knob or handle, a door opening actuator, an airplane cabin wall, an airplane storage bin, an airplane seat, an airplane tray table, a cruise ship surface, a counter top, a flooring, a matt, an electrical device, a ski lift chair or rail, or a sports locker.

The present antimicrobial material is advantageous over conventional polymeric materials. For example, it is can be cast or molded into flexible or rigid articles that can be used wherever conventional polymeric materials are used. Because the antimicrobial material has antiviral activity, it is especially useful for surfaces that are often touched by human subjects. Accordingly, the antimicrobial material is useful for destroying viruses, including coronaviruses, and decreasing risks of viral infection when contacting polymeric surfaces that are commonly encountered.

DRAWINGS

The drawings described herein are for illustrative purposes only of selected embodiments and not all possible implementations, and are not intended to limit the scope of the present disclosure.

FIG. 9 is a perspective view showing an exercise bench having a surface including an antimicrobial material in accordance with various aspects of the current technology.

FIG. 10 is a cross-sectional view, taken along line 10-10 of FIG. 9, showing an outer surface of the exercise bench.

FIG. 11 is a perspective view showing a public transit seat having a surface including an antimicrobial material in accordance with various aspects of the current technology.

FIG. 12 is a cross-sectional view, taken along line 12-12 of FIG. 11, showing the seat.

FIG. 13 is a perspective view showing a bicycle handle having a surface including an antimicrobial material in accordance with various aspects of the current technology.

FIG. 14 is a cross-sectional view, taken along line 14-14 of FIG. 13, showing the handle.

FIG. 15 is a perspective view showing a vital signs monitor having exposed components including an antimicrobial material in accordance with various aspects of the current technology.

FIG. 16 is a perspective view showing a door having surfaces and a handle including antimicrobial materials in accordance with various aspects of the current technology.

FIG. 17 is a cross-sectional view, taken along line 17-17 of FIG. 16, showing a hand plate on the door.

FIG. 18 is a perspective view showing an airplane cabin having surfaces including an antimicrobial material in accordance with various aspects of the current technology.

FIG. 19 is a cross-sectional view, taken along line 19-19 of FIG. 18, showing a sitting portion of a seat located within the airplane cabin.

FIG. 20 is a cross-sectional view, taken along line 20-20 of FIG. 18, showing an armrest of a seat located within the airplane cabin.

FIG. 27 is a perspective view showing a computer having surfaces including an antimicrobial material in accordance with various aspects of the current technology.

FIG. 28 is a cross-sectional view, taken along line 28-28 of FIG. 27, showing a key of the computer.

FIG. 29 is a perspective view showing a credit card machine having surfaces including an antimicrobial material in accordance with various aspects of the current technology.

FIG. 30 is a cross-sectional view, taken along line 30-30 of FIG. 29, showing the credit card machine.

FIG. 33B is a perspective view showing a sports locker having surfaces including an antimicrobial material in accordance with various aspects of the current technology.

FIG. 34 is a cross-sectional view, taken along line 34-34 of FIG. 33, showing a wall of the sports locker.

FIG. 35 is a cross-sectional view, taken along line 35-35 of FIG. 33, showing drawers of the sports locker.

Corresponding reference numerals indicate corresponding parts throughout the several views of the drawings.

DETAILED DESCRIPTION

Example embodiments will now be described more fully with reference to the accompanying drawings.

The current technology provides antimicrobial polymers used for producing automotive interior products, synthetic leather, gym equipment, flooring, wallets, medical instruments or medical plastics, electronics (e.g., housings, keyboards, laptops, and the like), public transit surfaces (e.g., automotive vehicle interior surfaces, waiting benches, handrails, and the like), cruise ship interior surfaces, sports equipment, and plastic door handles/pads. Automotive interior products include soft skins, seating materials, class-A hard trim components, such as map-pocket, A-pillars, B-pillars, C-pillars, consoles, doors, and instrument panels. All of the above applications are exemplary and non-limiting as it is understood that the current technology is applicable to all plastic surfaces that are configured to be touched by human subjects.

The current technology also provides graphene-based antiviral polymers for automotive vehicle and aircraft interior parts and other high touch surfaces. As non-limiting examples, the interior part can be an interior trim panel, an automotive vehicle instrument panel, an airbag cover, a door trim panel, a center console, a knee bolster, a seat mechanism cover, a sun visor, a pillar cover, or the like. Other high touch surfaces include synthetic leather, flooring, gym equipment, wallets, medical instruments or medical plastics, hospitals, electronics (e.g., keyboards, laptops credit card machines, and the like), public transit applications, including public transport vehicle interiors and subway or train station benches, handrails, and the like, cruise ship interiors, sports equipment, gas pumps (including housing, key pads, and pump handles), and polymeric door handles and pads.

In certain aspects, the current technology provides graphene- or graphene-metal oxide complex-infused rigid and/or flexible PVC, TPU, TPO and injection grade PP, TPE, TPO, ABS, PC/ABS, and PC/PVC. Similar polymers, such as PE, nylon, and the like, are also contemplated. As used herein, the term "rigid' means that the "rigid" materials is substantially inflexible. In other words, the rigid materials may be bendable to a slight extent, but are at risk of cracking or breaking after a bending threshold is reached, such as may be exhibited by an automotive vehicle interior panel. On the other hand, "flexible" materials can be heavily bent or folded without cracking or breaking, such as may be exhibited by a synthetic leather.

Articles with Antimicrobial Surfaces

Figure 1:
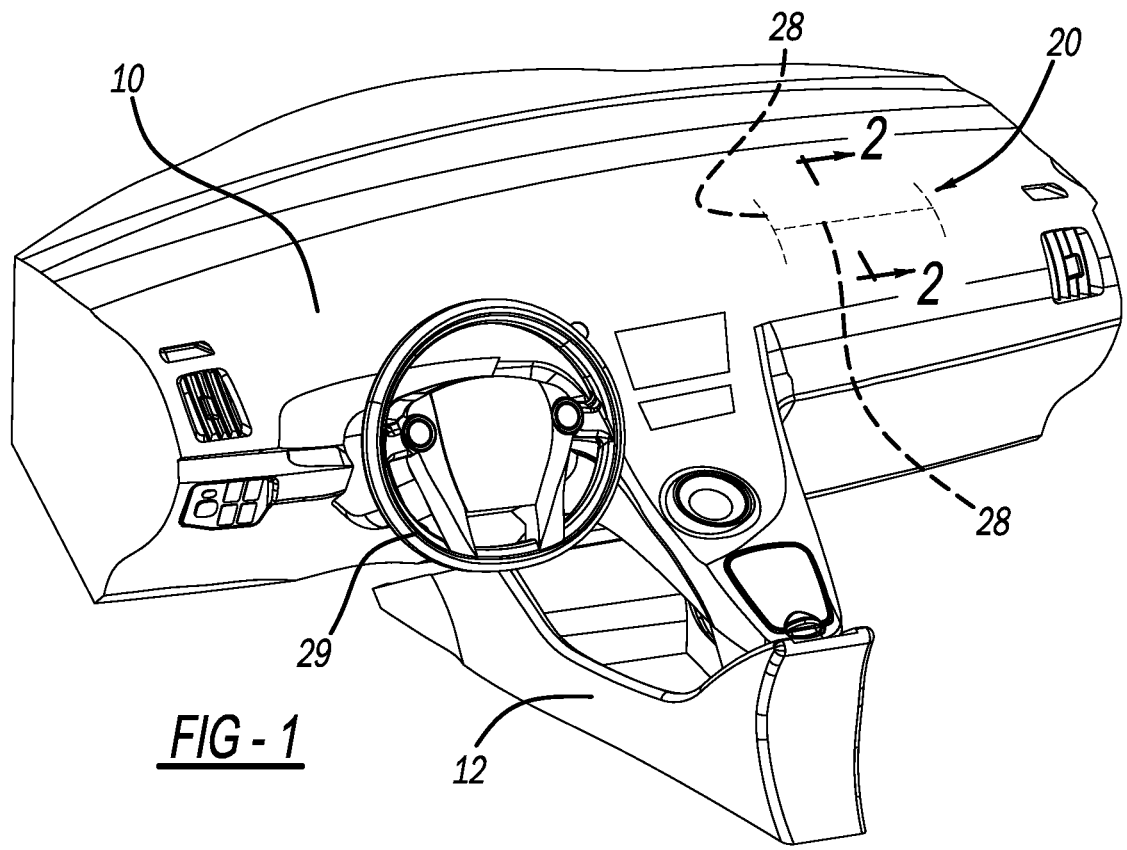
FIG. 1 is a perspective view showing an interior trim panel having antimicrobial surfaces in accordance with various aspects of the current technology.
Figure 2:
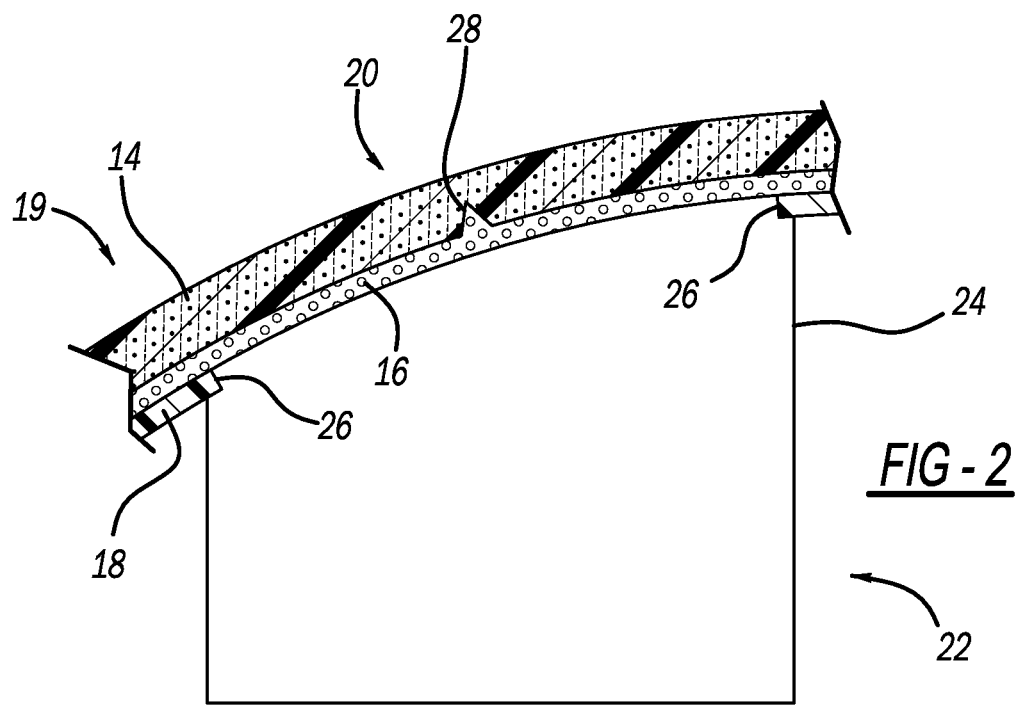
FIG. 2 is a cross-sectional view, taken along line 2-2 of FIG. 1, showing the interior trim panel.

An interior trim panel for a wheeled automotive land vehicle is shown in FIGS. 1 and 2. The interior trim panel is preferably an instrument panel 10 but may alternately include a center console 12, a separate airbag cover, a door trim panel, center console, a knee bolster, a seat mechanism cover, a sun visor, a pillar cover, or the like. Instrument panel 10 includes an outer skin 14, a middle pliable foam layer 16 and an inner rigid substrate 18. Also, a steering wheel 29 extends from the instrument panel 10.

A section of skin 14 acts as an integral airbag door 20 behind which is an airbag assembly 22 including a chute 24. Airbag door 20 hinges or pivots about upper and lower flexure lines adjacent generally horizontally elongated substrate edges 26 when an expanding airbag bursts tear seams 28 in skin 14. A "seamless" or hidden style of skin 14 is preferred whereby tear seams 28 are on the backside surface thereof and are not visible to the vehicle occupant or user. Tear seams 28 preferably have an H-shape, although other configurations such as U-shapes, and X-shapes can be employed. Each of the above components of the instrument panel 10 can comprise an antimicrobial material of the current technology. For example, each of the instrument panel 10, center console 12, airbag cover, door trim panel, center console, knee bolster, seat mechanism cover, pillar cover, a steering wheel, and air bag door 20 can include an outer skin including a flexible antimicrobial material of the current technology or be composed of a rigid antimicrobial material of the current technology.

Figure 3:
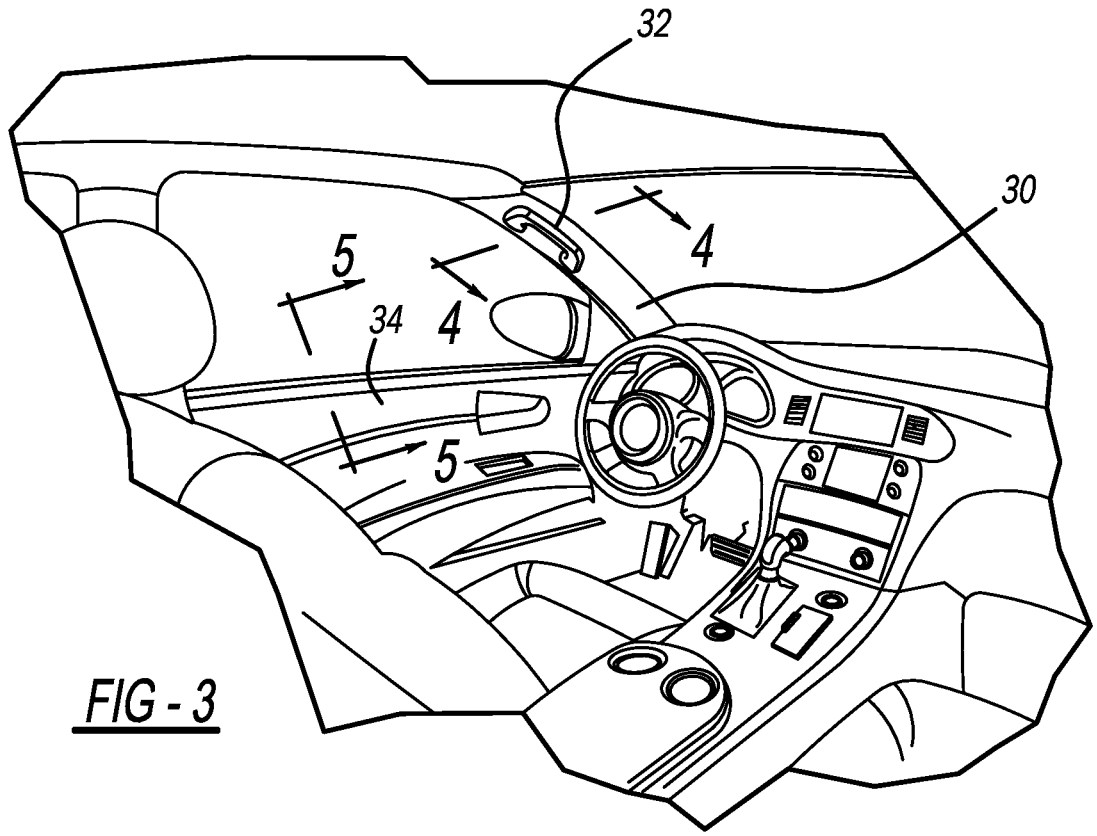
FIG. 3 is a perspective view showing an A-pillar, a handle, and a door skin having surfaces including antimicrobial materials in accordance with various aspects of the current technology.
Figure 4:
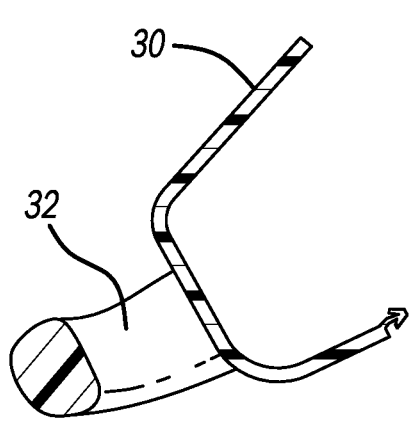
FIG. 4 is a cross-sectional view, taken along line 4-4 of FIG. 3, showing the A-pillar and the handle.
Figure 5:
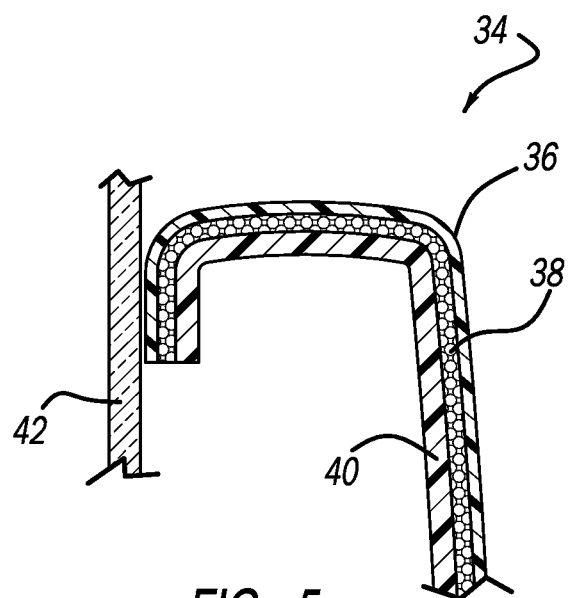
FIG. 5 is a cross-sectional view, taken along line 5-5 of FIG. 3, showing the door skin.

An A-pillar trim panel 30 including a handle 32 and an interior door trim panel 34 are shown in FIGS. 3-4. The A-pillar trim panel 30 and the handle 32 include an outer surface including an antimicrobial material of the current technology. At last one flexible fastener is provided on a back side of the A-pillar trim panel 30 to removably retain the A-pillar trim panel 30 to an underlying sheet metal A-pillar structure. Although not shown in FIGS. 3-4, it is understood that B-pillar trim panels and C-pillar trim panels can have the same configuration as the A-pillar trim panel 30.

The door trim panel 34 includes a flexible outer skin 36, an intermediate compressible foam layer 38 and an inner rigid substrate 40. The inner rigid substrate 40 is removably secured to a sheet metal door structural panel 42 by fasteners. Furthermore, the flexible outer skin 36 includes an antimicrobial material of the current technology and the inner rigid substrate 40 is molded from a polymer or from fiber-based composites.

Figure 6:
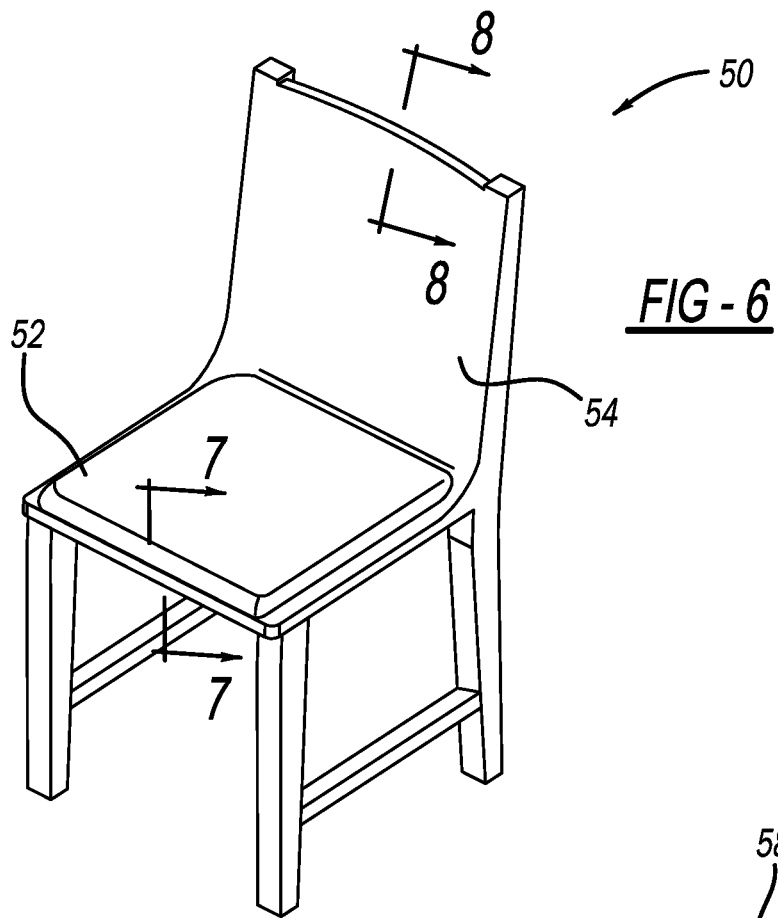
FIG. 6 is a perspective view showing a chair having surfaces including an antimicrobial material in accordance with various aspects of the current technology.
Figure 7:
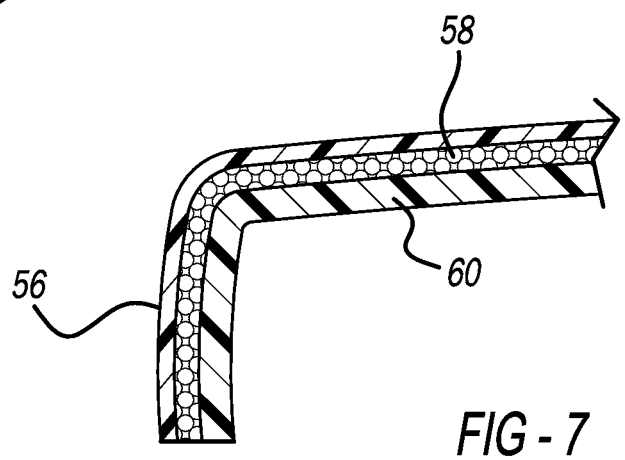
FIG. 7 is a cross-sectional view, taken along line 7-7 of FIG. 6, showing a backrest portion of the chair.
Figure 8:
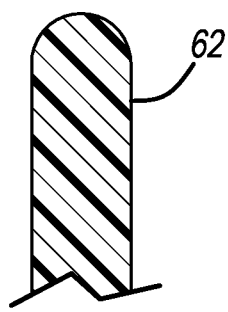
FIG. 8 is a cross-sectional view, taken along line 8-8 of FIG. 6, showing a sitting surface of the chair.

As can be observed in FIGS. 6-8, a chair 50 has surfaces including the antimicrobial material of the current technology. The chair 50 includes a sitting surface 52 and a backrest 54. The sitting surface 52 includes an outer antimicrobial surface 56 including an antimicrobial material of the current technology. The outer antimicrobial surface 56 is disposed on a compressible foam layer 58 and the compressible foam layer 58 is disposed on an inner rigid substrate 60. The backrest 54 may only include the antimicrobial material, but can alternatively include the same components of the sitting surface 52.

With reference to FIGS. 9-10, an exercise or workout bench 70 includes a surface 72 configured to be sat on or laid on. The surface 72 includes an outer antimicrobial surface 74 including an antimicrobial material of the current technology. The outer antimicrobial surface 74 is disposed on a compressible foam layer 76, which is disposed on an inner rigid substrate 78.

FIGS. 11-12 show a public transit seat 80 having a first exposed surface 82 and a second exposed surface 84 disposed on the first exposed surface 82. Whereas the first exposed surface 82 is rigid, the second exposed surface can be rigid or soft and flexible. At least one of the exposed surfaces 82, 84 includes an antimicrobial material of the current technology. FIG. 11 also shows a handrail 86 located adjacent to the seat 80. An exterior surface of the handrail 86 can also include an antimicrobial material of the current technology.

Referring to FIGS. 13-14, a bicycle handle 90 has an outer surface 92 including an antimicrobial material of the current technology. The outer surface 92 is disposed on and about a rigid polymeric, metal, or steel substrate 94. A motorcycle handle can have the same or substantially similar configuration.

Electronic devices including an outer, protective housing, internal electrical circuits, a power supply, and human-contactable surfaces, such as buttons, knobs, and display screens, employ an antimicrobial material according to the current technology on an outside surface thereof. One example of such an electronic device is a vital signs monitor 100 as provided in FIG. 15. The vital signs monitor 100 includes a housing 102, buttons 104, a knob 106, and a screen 108. At least one of the housing 102, buttons 104, knob 106, or screen 108 includes an antimicrobial material of the current technology.

With reference to FIGS. 16-17, a door 110 includes a handle 112, a hand plate 114, and a kick plate 116. The door 110 is a residential, commercial, office, or manufacturing plant door coupled to a stationary doorjamb. Although the door 110 is shown with the handle 112, the handle 112 can alternatively be a knob. At least one of the handle 112, hand plate 114, and kick plate 116 includes an antimicrobial material of the current technology. Adjacent to the door is a button 120 for opening the door 110. The button is part of an electronic device internally including an electrical switch and circuits. An exterior surface of the button 120 includes the antimicrobial material.

FIGS. 18-20 show aspects of an airplane cabin 130. The airplane cabin includes a storage bin 132, a wall 134, and a seat 136. The storage bin 132 and the wall 134 including an antimicrobial material of the current technology. The seat 136 includes a sitting portion 138, a backrest 140, and armrests 142. The sitting portion 138 includes an outer skin 144 including an antimicrobial material of the current technology, which is disposed on a compressible foam substrate 146. The backrest 140 can have the same or substantially similar configuration. The armrests 142 comprise a second outer skin 148 disposed on a rigid metal or steel substrate 150. Although not shown, an airplane tray table can also have a surface including an antimicrobial material of the current technology.

Figure 21:
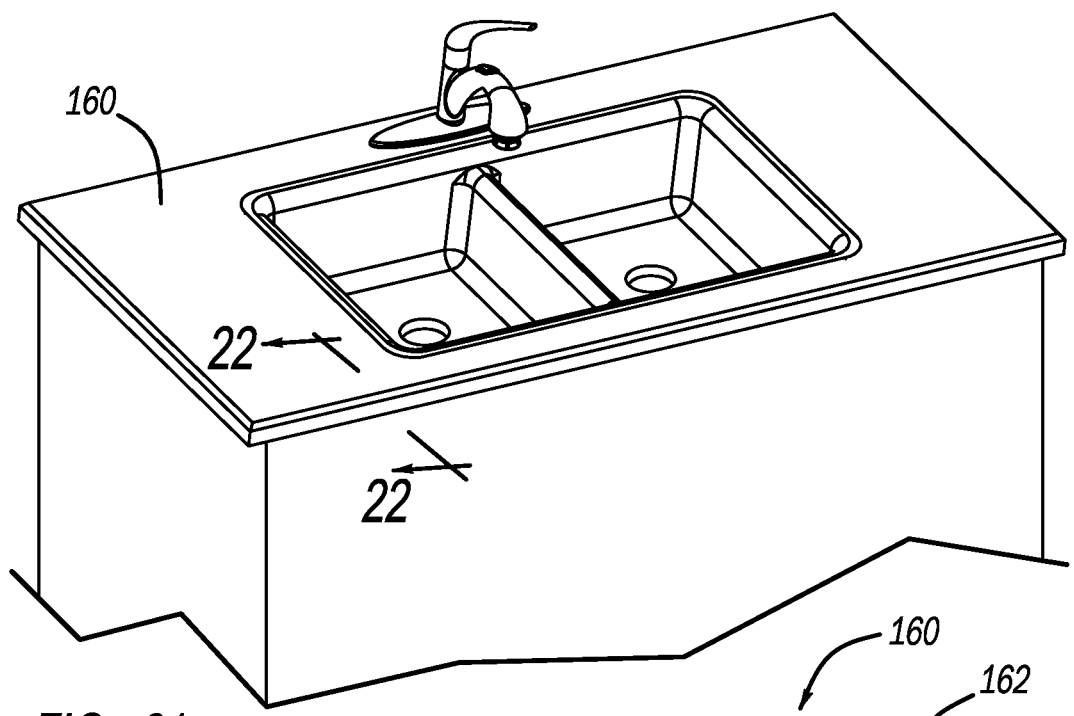
FIG. 21 is a perspective view showing a countertop having a surface including an antimicrobial material in accordance with various aspects of the current technology.
Figure 22:
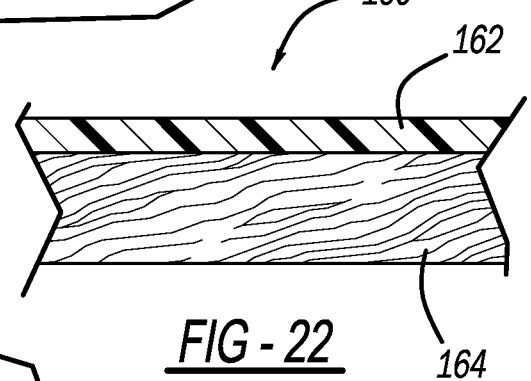
FIG. 22 is a cross-sectional view, taken along line 22-22 of FIG. 21, showing the countertop.

As shown in FIGS. 21-22, a countertop 160 has an outer surface 162 including an antimicrobial material of the current technology. The outer surface 162 is disposed on a rigid substrate 164 including a rigid polymer, a metal, steel, or wood. Shelves, drawers, or the like may optionally be located in a counter supporting the rigid substrate 164 of the countertop 160.

Figure 23:
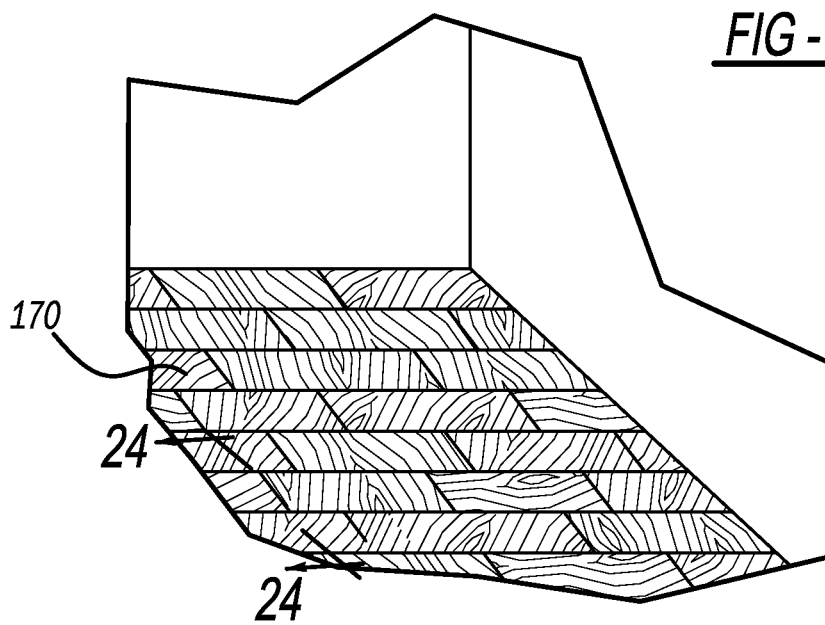
FIG. 23 is a perspective view showing flooring having a surface including an antimicrobial material in accordance with various aspects of the current technology.
Figure 24:
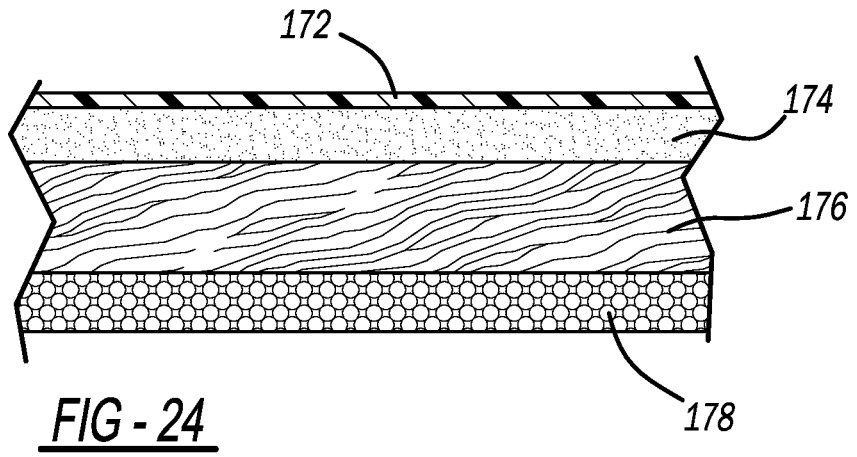
FIG. 24 is a cross-sectional view, taken along line 24-24 of FIG. 23, showing the countertop.

FIGS. 23-24 depict a flooring 170 having an outer wear layer 172 including an antimicrobial material of the current technology. Although various architectures as possible, in the flooring 170, the wear layer is disposed on a paper or print layer 174, which is disposed on a first rigid under layer 176, such as a high density fiberboard, which is disposed on a second under layer 178, such a foam under layer.

Figure 25:
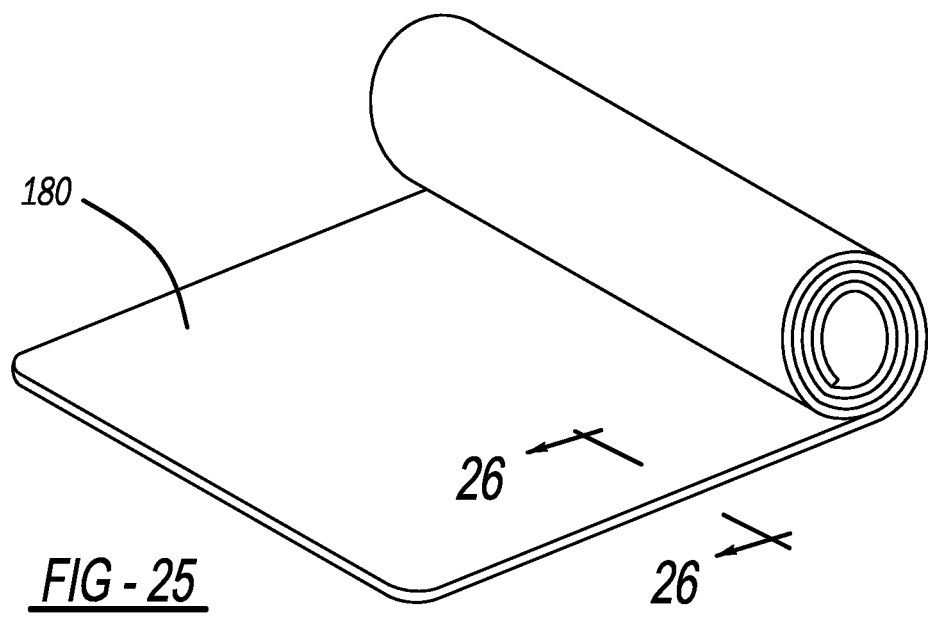
FIG. 25 is a perspective view showing a matt composed of an antimicrobial material in accordance with various aspects of the current technology.
Figure 26:
FIG. 26 is a cross-sectional view, taken along line 26-26 of FIG. 25, showing the matt.

FIGS. 25-26 provide an illustration of a matt 180. The matt 180 can be, for example, an exercise matt or a yoga matt that is flexible and portable (for hand carrying by a user). The matt 180 includes an antimicrobial material of the current technology.

Another exemplary electrical device is shown in FIGS. 27-28, as a computer 190, such as a notebook or laptop. The computer 190 includes a housing 192 including an antimicrobial material of the current technology. The computer 190 also includes a plurality of keys 194, wherein each key 194 of the plurality includes an outer surface layer 196 including an antimicrobial material of the current technology. The outer surface layer 196 is disposed on a rigid substrate 198.

A further exemplary electrical device is shown with reference to FIGS. 29-30, as a credit card machine 200, which may be a credit card reader. The credit card machine 200 includes a housing 202 and a plurality of buttons 204. The housing and the buttons 204 comprise an antimicrobial material of the current technology.

Figure 31:
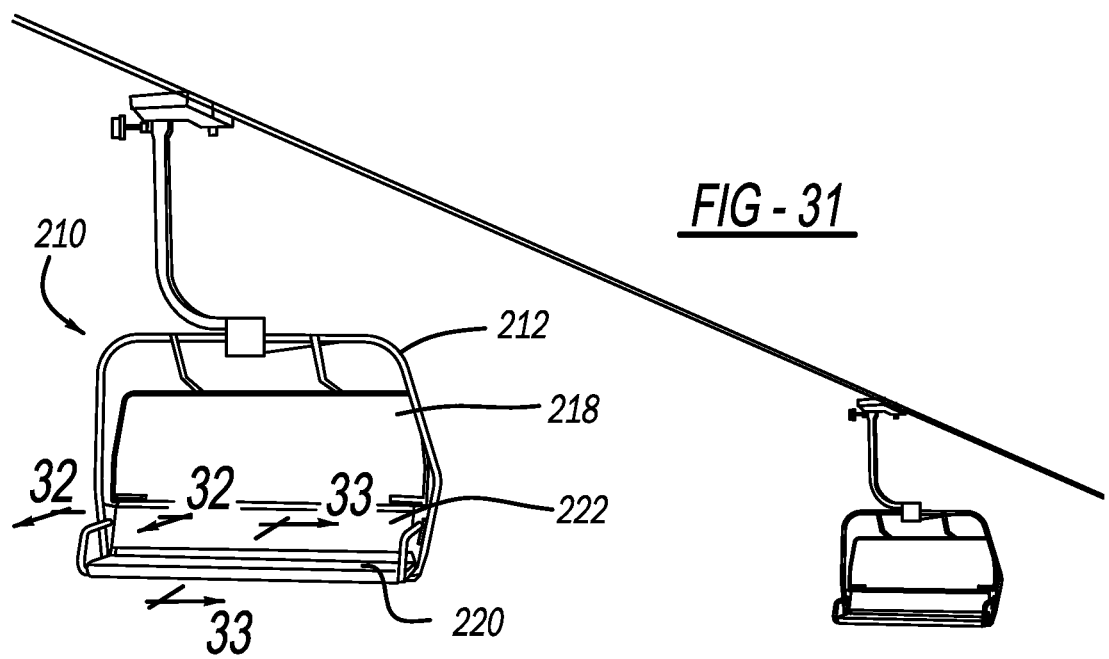
FIG. 31 is a perspective view showing a ski lift having surfaces including an antimicrobial material in accordance with various aspects of the current technology.
Figure 32:
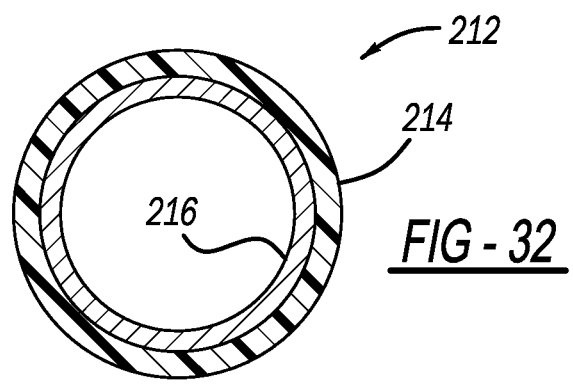
FIG. 32 is a cross-sectional view, taken along line 32-32 of FIG. 31, showing a seating surface of the ski lift.

FIGS. 31-32 show a ski lift 210 including handrails 212. The handrails including an outer surface layer 214 disposed on and about a rigid metal or steel substrate 216. The outer surface layer 214 includes an antimicrobial material of the current technology. The ski lift 210 also includes a seat 218 including a sitting portion 220 and a backrest 222. The sitting portion 220 and the backrest comprise an antimicrobial material of the current technology.

Figure 33A:
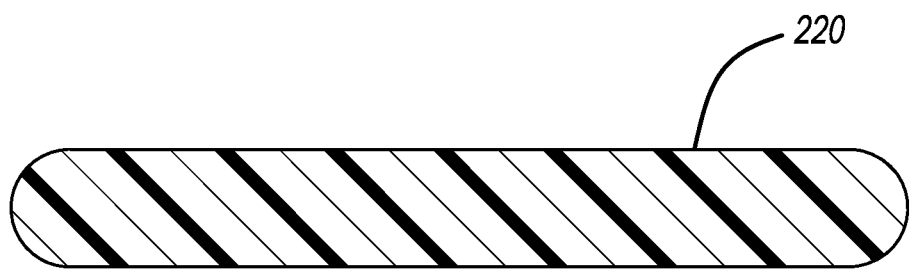
FIG. 33A is a cross-sectional view, taken along line 33-33 of FIG. 31, showing the seating surface.

As can be seen in FIGS. 33-35, a sports locker 230 includes walls 232, drawers 234, and a shelf 236. The walls 232 have an outer layer 238 including an antimicrobial material of the current technology, which is disposed on a rigid substrate 240. The shelf 236 also has an outer surface including an antimicrobial material of the current technology. The drawers 234 have an outer drawer layer 242 including an antimicrobial material of the current technology, wherein the outer drawer layer 242 is disposed on a rigid drawer substrate 244.

Figure 36:
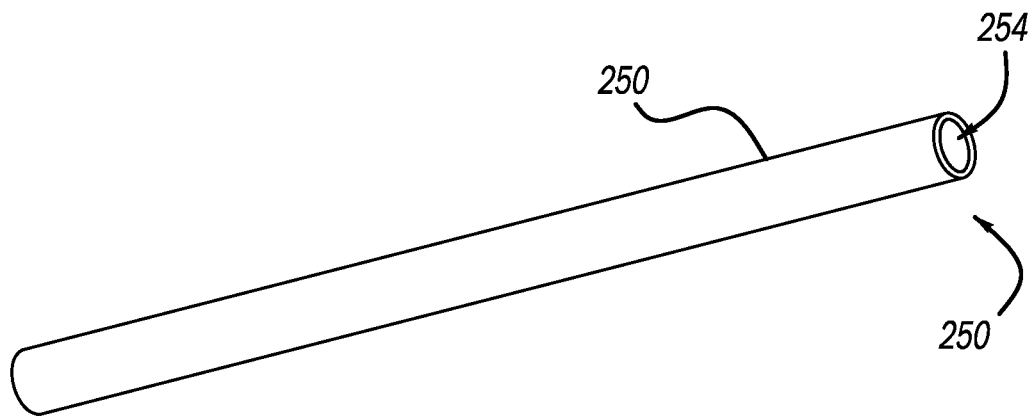
FIG. 36 is a perspective view showing a rigid pipe having a surface including an antimicrobial material in accordance with various aspects of the current technology.
Figure 37:
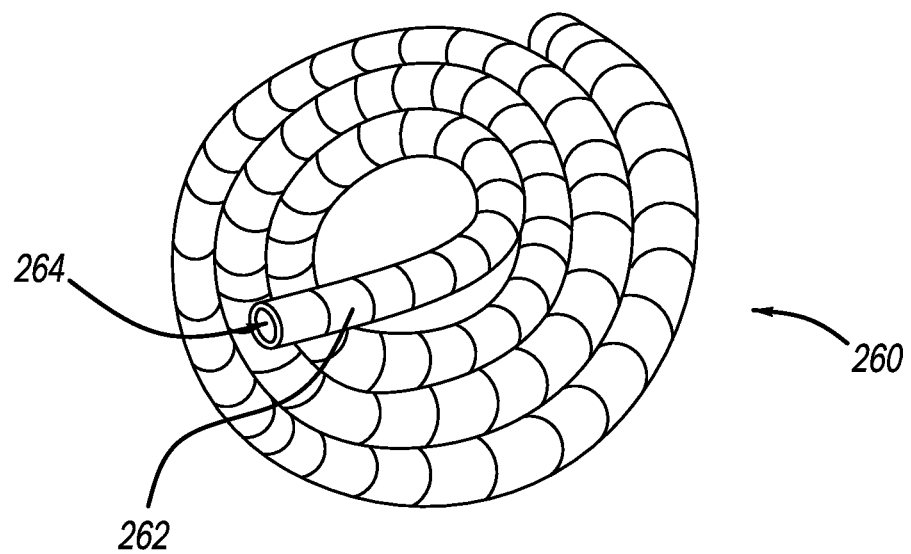
FIG. 37 is a perspective view showing a flexible pipe having a surface including an antimicrobial material in accordance with various aspects of the current technology.

FIG. 36 shows a rigid pipe 250 including a rigid body or outer surface 252 including an antimicrobial material of the current technology, wherein the rigid body or outer surface 252 defines a hollow interior core 254. As a non-limiting example, the rigid body or outer surface 252 can include rigid PVC. FIG. 37 shows a flexible pipe 260 including a flexible body or outer surface 262 including an antimicrobial material of the current technology, wherein the flexible body or outer surface 262 defines a hollow interior core 264. As a non-limiting example, the flexible body or outer surface 262 can include flexible PVC. The pipes 250, 260 exhibit antimicrobial activity, including antiviral activity, and are useful at least in plumbing applications as fresh water pipes and sewage pipes. For example, the rigid body or outer surface 252. Exemplary materials and methods serving as a basis for making the pipes 250, 260 can be found in U.S. Pat. No. 8,178,640, which is incorporated herein by reference in its entirety. For example, the PVC materials in U.S. Pat. No. 8,178,640 can be modified in accordance with the current technology in order to exhibit antimicrobial activity.

Antimicrobial Materials

Figure 38:
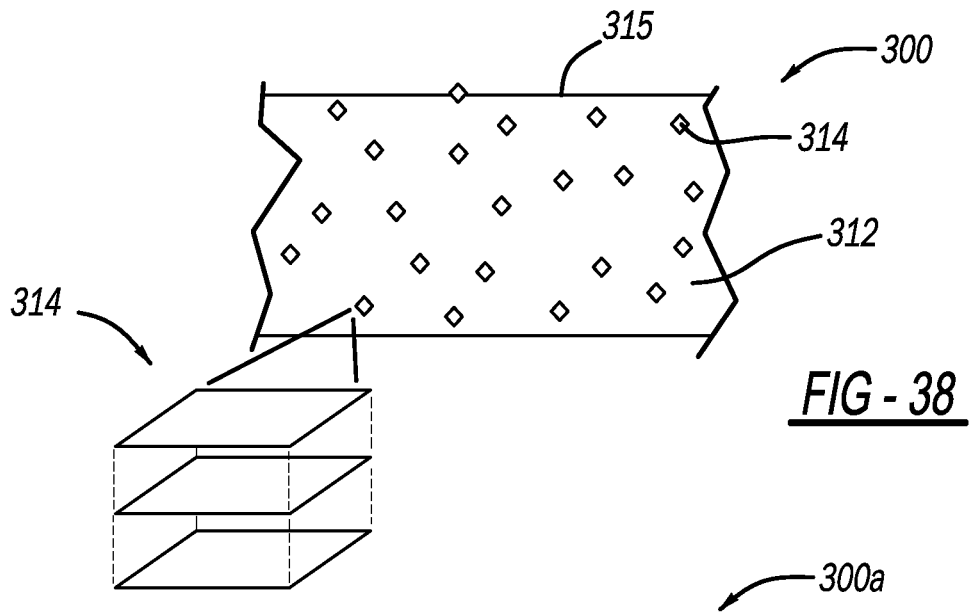
FIG. 38 is a perspective view showing a first antimicrobial material in accordance with various aspects of the current technology.

With reference to FIG. 38, the current technology provides an antimicrobial material 300. As used herein, the term "antimicrobial" provides that the antimicrobial material 300 has antiviral properties, i.e., the antimicrobial material 300 is an antiviral material, and in some aspects, also has antibacterial properties, i.e., the antimicrobial material 300 can be an antiviral and antibacterial material, and/or antifungal properties, i.e., the antimicrobial material 300 can be an antiviral and antibacterial and/or antifungal material. As such, when a virus contacts the antimicrobial material 300, the virus is disabled, inactivated, destroyed, or "killed" such that the virus is no longer capable of infecting a subject. Similarly, when the antimicrobial material has antibacterial properties, when a bacterium contacts the antimicrobial material 300, the bacterium is killed. The term "antiviral" provides that the antiviral material disables, inactivates, destroys, or "kills" at least SARS-CoV-2, and in some aspects, also kills other viruses, including other coronaviruses. The antimicrobial material 300 has antiviral activity due to its ability, for example, to disrupt virus host cell recognition by denaturing protein structures on viral surfaces, leading to the inactivation of viruses regardless of the presence of a viral envelope. The antimicrobial material 300 disables, inactivates, destroys, or "kills" greater than or equal to about 90%, greater than or equal to about 95%, greater than or equal to about 98%, greater than or equal to about 99%, such as about 90%, about 91%, about 92%, about 93%, about 94%, about 95%, about 96%, about 97%, about 98%, about 99%, or about 99.9%, of SARS-CoV-2 viral particles or plaque forming units (PFUs) in less than or equal to about 4 hours, less than or equal to about 3 hours, less than or equal to about 2 hours, less than or equal to about 1 hours, less than or equal to about 45 minutes, less than or equal to about 30 minutes, or less than or equal to about 15 minutes.

The antimicrobial material 300 includes a polymeric matrix 312 and graphene particles 314 disposed and/or embedded in the polymeric matrix 312, including at an exposed surface 315. As used herein, a "polymeric matrix" is a bulk polymer-based composition or material. Accordingly, the polymeric matrix 312 comprises at least one solidified or cured polymer that embeds antimicrobial particles, such as the graphene particles 314. Depending on a predetermined application, the antimicrobial material 300 can be flexible and soft or relatively rigid. The hardness, rigidness, and flexibility of the antimicrobial material 300 is provided by the polymer matrix 312, which includes a polymer. For example, for applications requiring soft and flexible materials, such as for a synthetic leather or skin, as non-limiting examples, the polymer of the polymer matrix 312 includes polyvinyl chloride (PVC), a thermoplastic elastomer (TPE), or a combination thereof. The TPE includes a thermoplastic polyurethane (TPU), a thermoplastic polyolefin (TPO), thermoplastic vulcanizates (TPV), or combinations thereof. Non-limiting examples of TPUs include reaction products of aromatic or aliphatic isocyanates with a polyether or polyester polyol, such as TEXIN® 3042 TPU (Covestro). Non-limiting examples of TPOs include olefin block copolymers (OBCs), INFUSE™ olefin block copolymer resins (Dow), ENGAGE™ polyolefin elastomer resins (Dow), styrene-ethylene-butylene-styrene (SEBS) polymer, such as KRATON™ SEBS polymer (Kraton), and the like. For applications requiring rigid materials, such as for a pillars, and panels, as non-limiting examples, the polymer of the polymer matrix 312 includes polypropylene (PP), acrylonitrile butadiene styrene (ABS), polycarbonate (PC), PC/ABS, PC/PP, a TPE, or combinations thereof. Non-limiting examples of TPUs include aliphatic and aromatic TPUs, such as TEXIN® TPUs (Covestro). Non-limiting examples of hard TPEs include OBCs, INFUSE™ olefin block copolymer resins (Dow), ENGAGE™ polyolefin elastomer resins (Dow), styrene-ethylene-butylene-styrene (SEBS) polymer, such as KRATON™ SEBS polymer (Kraton), and the like. Additional applications for soft and hard antimicrobial materials are provided below.

Polymers include poly vinyl chloride (PVC), styrene acrylo nitrile (SAN), poly styrene (PS), poly methyl methacrylate (PMMA), ABS, styrene maleic anhydride (SMA), polyphenylene oxide (PPO), ply carbonate (PC), poly phthalate carbonate (PPC) poly tetrafluoro ethylene (PTFE), polyacrylate (PAR) ply ether sulfone (PES), poly ether imide (PEI), poly phenyl sulfone (PPSU), thermoplastic polyimide (TPI), poly amide imide (PAI), high density polyethylene (HDPE), low density poly ethylene (LDPE), poly propylene (PP), ultra high molecular weight poly ethylene (UHMWPE), poly oxy methylene (POM), poly amide (PA), poly butylene terephthalate (PBT), poly ethylene terephthalate (PET), poly amide-4,6 (PA-4,6), poly phthal amide (PPA), poly phenylene sulfide (PPS), liquid crystal polymers (OCP), poly vinyl diene fluoride (PVDF), fluoro polymers (FP), poly ether ether ketone (PEEK), and combinations thereof, as non-limiting examples.

Soft Skins for automotive interiors are conventionally used on consoles, armrests, door-uppers, and instrument panels applications. Automotive vehicle soft skins are made from a variety of polymeric materials including flexible PVC, TPU, TPO, and TPEs. These skins can be produced by methods such as slush rotational molding, injection molding, thermoforming, and from cut and sew applications. Accordingly, the polymer of the polymer matrix 312 can include PVC, TPU, TPO, and TPEs can be used as a polymer of the polymer matrix 312.

Automotive vehicle interior Class-A hard trim materials are conventionally made from a variety of polymeric materials including PP, TPO, TPE, and glass/talc/mineral-filled PP/TPO/TPE, which can comprise the polymer of the polymer matrix 312. These Class A hard trim materials can be made by methods such as injection molding and compression molding using polymers including PP, TPO, TPE, and glass/talc/mineral-filled PP/TPO/TPE for the polymer matrix 312.

Synthetic leather is made up of flexible PVC, TPU, TPV, and TPO and is conventionally produced in a calendaring process via melt extrusion and used as an alternative to animal leather for decorating/A-surface material on automotive interiors and in furnishings. Accordingly, the flexible PVC, TPU, TPV, and TPO can be used as a polymer of the polymer matrix 312.

Interior automotive polymers, components, panels, trim, and skins are described in U.S. Pat. Nos. 10,358,159; 10,328,881; 10,232,755; 10,093,268; 9,713,972; 9,539,745; 9,440,385; 5,824,738; U.S. Patent Publication No. 2020/0139814; U.S. Patent Publication No. 2019/0344689; U.S. Patent Publication No. 2018/0044536; U.S. Patent Publication No. 2017/0100992; and U.S. Patent Publication No. 2015/0360597; all of which are incorporated herein by reference in their entirety.

Other high touch surfaces that can benefit from the current technology include synthetic leather, gym equipment, flooring, wallets, medical instruments or medical plastics, electronics (e.g., housings, keyboards, laptops, credit card machines, and the like), public transit surfaces (e.g., automotive vehicle interior surfaces, waiting benches, handrails, and the like), cruise ship interior surfaces, sports equipment, and plastic door handles/pads. The polymer matrix 312 of these high touch surfaces can comprise PP, TPE, TPO, TPV, ABS, PC/ABS, PC/PVC, and combinations thereof, as non-limiting examples. These products are produced using rotational molding, injection molding, calendaring, extruding, thermoforming, cut and sew applications, and combinations thereof.

The graphene particles 314 are antimicrobial particles or flakes including graphene or a graphene derivative, such as graphene oxide as a non-limiting example, that provide at least the antiviral activity. The graphene particles 314 have greater than or equal to 1 to less than or equal to 10 layers or greater than or equal to 6 to less than or equal to 10 layers, wherein each layer includes carbon atoms arranged in a two-dimensional honeycomb-shaped lattice. In various aspects, the graphene particles 314 have 1, 2, 3, 4, 5, 6, 7, 8, 9, or 10 of the layers. The graphene particles 314 have a diameter of greater than or equal to about 750 nm to less than or equal to about 250 µm, greater than or equal to about 1 µm to less than or equal to about 100 µm, or greater than or equal to about 1 µm to less than or equal to about 50 µm.

Without being bound by theory, the antimicrobial properties of graphene, and graphene-derivatives (e.g., graphene oxide), are attributed to their electron movement towards microbes. This migration causes cytoplasmic efflux, decreases metabolism, affects lipid membrane, induces oxidative stress, produces reactive oxygen species (ROS), loss of glutathione, and finally causes microbial death. As non-limiting examples, graphene can be used to kill different coronaviruses, including SARS-CoV strains.

Figure 39:
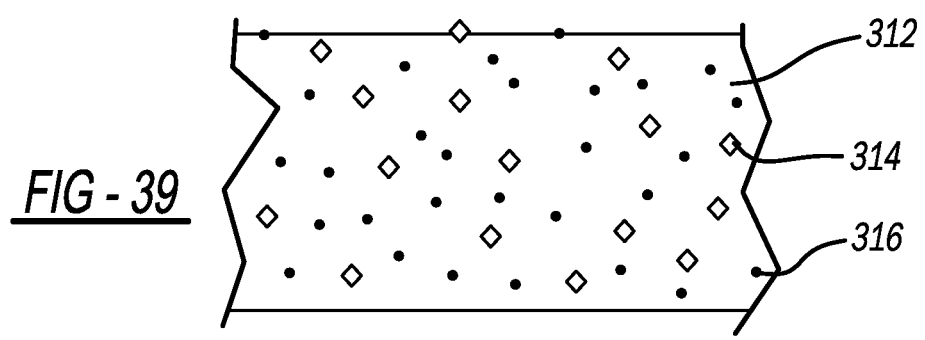
FIG. 39 is a perspective view showing a second antimicrobial material in accordance with various aspects of the current technology.
Figure 40:
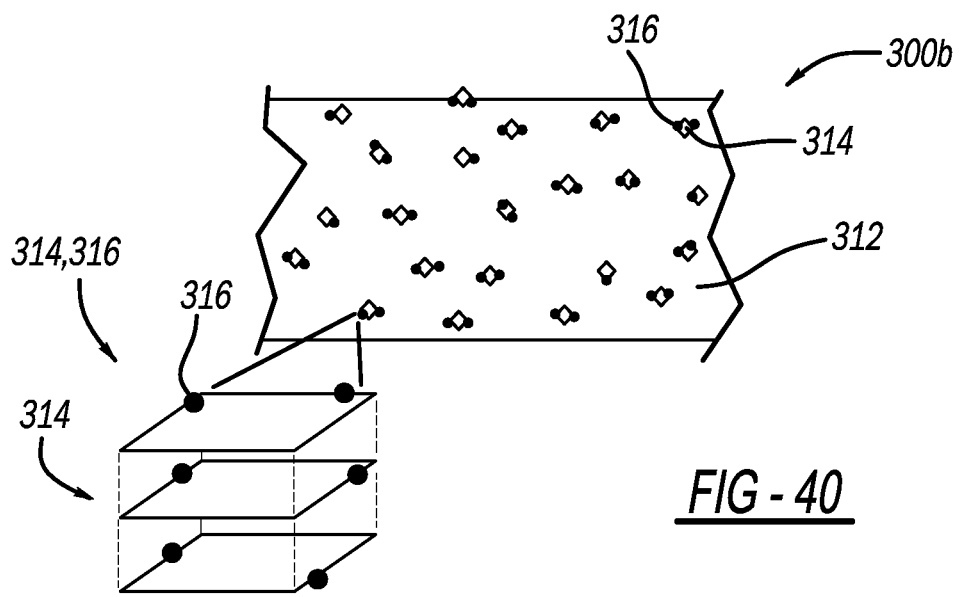
FIG. 40 is a perspective view showing a third antimicrobial material in accordance with various aspects of the current technology.

In some aspects, the antimicrobial material 300 includes an additional antimicrobial agent. FIGS. 39 and 40 shows antimicrobial materials 300a, 300b including the polymeric matrix 312 and the graphene particles 314. However, the antimicrobial materials 300a, 300b further includes metal oxide particles 316, wherein the metal oxide particles 316 also provide at least antiviral activity against as defined above in regard to the graphene particles 314. The metal oxide particles 316 includes cuprous oxide ($Cu_2O$) particles, zinc oxide (ZnO) particles, silver oxide ($Ag_2O$), or combinations thereof. These metal oxide particles release antimicrobial ions, such as $Cu^{1+}$, $Ag^{1+}$ and/or $Zn^{2+}$, and are used to prepare antimicrobial surfaces. Graphene and/or graphene oxide can promote antimicrobial activities of these ions further and improve the effectiveness. The metal oxide particles have a diameter of greater than or equal to about 100 nm to less than or equal to about 100 µm, greater than or equal to about 200 nm to less than or equal to about 10 µm, greater than or equal to about 250 nm to less than or equal to about 5 µm, or greater than or equal to about 250 nm to less than or equal to about 1.8 µm.

As shown in FIG. 39, the graphene particles 314 and the metal oxide particles 316 are individually uniformly dispersed throughout the polymeric matrix 312 in the antimicrobial material 300a. By "individually uniformly dispersed," it is meant that the graphene particles 314 and the metal oxide particles 316 are blended within the polymer matrix 312 without respect to each other. Inasmuch as some graphene particles 314 and metal oxide particles 316 may be in contact with each other, the contact is random and an artifact of a mixing step of a fabrication method for the antimicrobial material 300a as discussed below. Therefore, contact between a portion of the graphene particles 314 and a portion of the metal oxide particles 316 is not intended, but may be present.

As shown in FIG. 40, the graphene particles 314 and the metal oxide particles 316 are present as graphene-metal oxide particle complexes 314,316 that are uniformly dispersed throughout the polymeric matrix 312 in the antimicrobial material 10b. As such, the graphene particles 314 carry the metal oxide particles 316 in the graphene-metal oxide particle complexes 314,316. Nonetheless, it is understood that there may be some, i.e., a minority portion, graphene particles 314 and/or metal oxide particles 316 that are present in the polymeric matrix 312 individually, and not in a graphene-metal oxide particle complex 314,316. As discussed below, the graphene-metal oxide particle complexes 314,316 are formed prior to blending with the polymer that defines the polymeric matrix 312 during a fabrication process.

In all of the descriptions of the current technology provided herein, the antiviral material 300 can alternatively be either the antiviral material 300a of FIG. 39 or the antiviral material 300b of FIG. 40, unless otherwise stated. Moreover, the antimicrobial material 300 can also include adjunct agents, such as plasticizers, compatibilizers, impact modifiers, light an UV stabilizers, heat stabilizers, color pigments, fillers (e.g., glass fibers), talc, minerals, glass, physical or chemical foaming agents, and combinations thereof.

The antimicrobial material 300 of FIG. 38 includes the polymer matrix 312, i.e., the polymer, at a concentration of greater than or equal to about 50 wt. % to less than or equal to about 99 wt. %. The graphene particles 314 have a concentration in the antimicrobial material 300 of greater than or equal to about 0.05 wt. % to less than or equal to about 10 wt. %, greater than or equal to about 0.1 wt. % to less than or equal to about 5 wt. %, or greater than or equal to about 0.25 wt. % to less than or equal to about 1 wt. %, including at concentrations of about 0.05 wt. %, about 0.1 wt. %, about 0.15 wt. %, about 0.2 wt. %, about 0.25 wt. %, about 0.3 wt. %, about 0.35 wt. %, about 0.4 wt. %, about 0.45 wt. %, about 0.5 wt. %, about 0.55 wt. %, about 0.6 wt. %, about 0.65 wt. %, about 0.7 wt. %, about 0.75 wt. %, about 0.8 wt. %, about 0.85 wt. %, about 0.9 wt. %, about 0.95 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %. The adjunct agent (or plurality of adjunct agents) is present in the antimicrobial material 300 at a concentration of greater than or equal to about 0 wt. % to less than or equal to about 50 wt. %, such as greater than or equal to about 0 wt. % to less than or equal to about 20 wt. % talc, greater than or equal to about 0 wt. % to less than or equal to about 20 wt. % glass fiber, greater than or equal to about 0 wt. % to less than or equal to about 5 wt. % compatibilizer, and greater than or equal to about 0 wt. % to less than or equal to about 5 wt. % impact modifier, The wt. % are based on the total weight of the antimicrobial material 300.

The antimicrobial materials 300a, 300b of FIGS. 39 and 40 have the same composition as the antimicrobial material 300, but further comprise greater than or equal to 0 wt. % to less than or equal to about 20 wt. % of the metal oxide particles 316, individually, with the proviso that at least one of the $Cu_2O$ particles or the ZnO particles is present in the antiviral material 300a, 300b. Therefore, the antiviral materials 300a, 300b include greater than 0 wt. % to less than or equal to about 20 wt. % of at least one of the $Cu_2O$ particles or the ZnO particles. The wt. % is based on the total weight of the antiviral material 300a, 300b.

Figure 41:
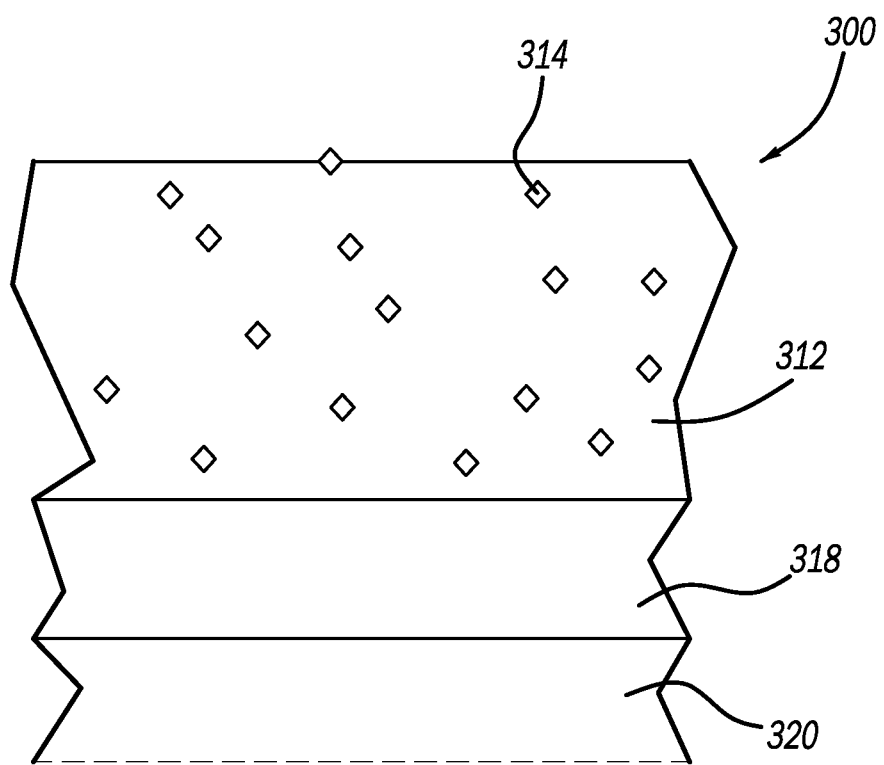
FIG. 41 is a perspective view showing an antimicrobial material disposed on at least one sublayer in accordance with various aspects of the current technology.

With reference to FIG. 41, in some aspects the antimicrobial material 300 is disposed over, about, and directly on a first sublayer or substrate 318. The first sublayer or substrate 318 can be a compressible foam, especially when the antimicrobial material 300 is soft and flexible, or a rigid substrate, especially when the antimicrobial material 300 is rigid. Moreover, the first sublayer or substrate 18 can be disposed on a second sublayer or substrate 320. For example, in various aspects, the antiviral material 300 is a soft flexible material, such as a synthetic leather, that is disposed over a compressible foam first sublayer or substrate 318, which itself is disposed on a rigid second sublayer or substrate 320.

The antimicrobial materials 300, 300a, 300b described herein may include at least the components described herein. However, it is understood that the antimicrobial materials 300, 300a, 300b may alternatively be limited to the components described herein or to a portion of the components described herein. For example, the antimicrobial material 300 can include an antimicrobial agent comprising, consisting essentially of, or consisting of graphene. By "consisting essentially of" it is meant that the antimicrobial material 300 only intentionally includes graphene as the antimicrobial agent and is substantially free of any other antimicrobial agents. By "substantially free" it is meant that additional antimicrobial agents may be included in trace amounts, i.e., less than or equal to about 5 wt. %, or less than or equal to about 1 wt. %, as impurities, wherein the trace amounts do not affect the antimicrobial activity provided by the graphene. Similarly, the antimicrobial materials 300a, 300b can include antimicrobial agents comprising, consisting essentially of, or consisting of graphene and at least one of $Cu_2O$, ZnO, or AgO.

Methods of Fabricating Antimicrobial Materials and Articles

Figure 42:
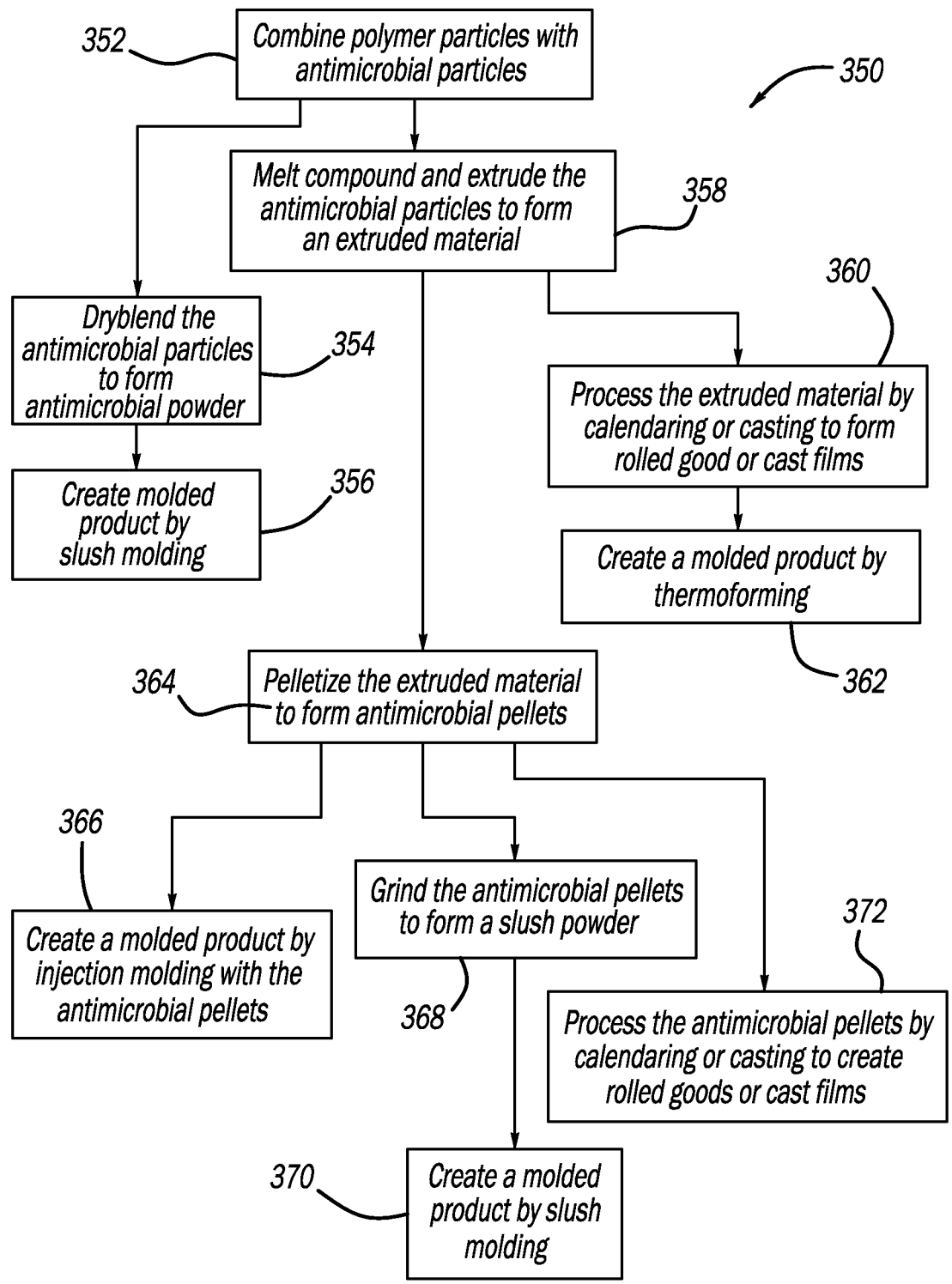
FIG. 42 is a diagrammatic flow chart showing a method for making an antimicrobial material in accordance with various aspects of the current technology.

With reference to FIG. 42, the current technology also provides a method 350 of making an antimicrobial material, the antimicrobial material being the antimicrobial materials 300, 300a, 300b discussed above with reference to FIGS. 38-41. At block 352, the method 350 includes combining polymer particles including a polymer with antimicrobial particles. The antimicrobial particles include graphene particles when making the antimicrobial composition 30 of FIG. 38. When making the antimicrobial composition 300a of FIG. 39, the method 350 includes separately adding the graphene particles and the metal oxide particles to the polymer particles. When making the composition 300b of FIG. 40, the method 350 includes combining the graphene particles with metal oxide particles and forming graphene particle-metal particle complexes, wherein the graphene particles carry the metal oxide particles covalently or non-covalently. The graphene particle-metal particle complexes are then added to the polymer particles during the combining.

In block 354, the method 350 includes dry blending the antimicrobial particles to form an antimicrobial powder or resin. The dry blending is performed by mechanically mixing the polymer, additives, and the antimicrobial particles at high speeds. The high speed mixing creates a high shear environment that increases temperature and promotes absorption. As can be seen in block 356, the method 350 can then include creating a molded product from the antimicrobial powder by slush molding.

In block 358, the method 350 includes melt compounding the polymer particles with the graphene particles to form a melt and extruding the melt to form an extruded material including the graphene particles, and optionally the metal oxide particles, dispersed in the polymer. The melt compounding and extruding is performed, for example, with a twin-screw extruder. The extruded material can be a solid, unitary thread or it can have a hollow interior, such as a cylinder or pipe.

In block 360, the method 350 includes processing the extruded material by calendaring or casting to form rolled goods or cast films as the antimicrobial material. In block 362, the method includes creating a molded product from the antimicrobial material by cutting and sewing, and thermoforming, wherein the thermoforming can be vacuum forming, pressure forming, or twin sheet forming.

In block 364, the method 350 includes pelletizing the extruded material to form antimicrobial pellets including the graphene particles, and optionally the metal oxide particles, dispersed in a polymeric pellet. The pelletizing is performed by cutting or grinding the extruded material into the antimicrobial pellets. The antimicrobial pellets can then be subjected to various processing methods. For example, a first processing method beginning in block 366 and includes creating a molded product by injection molding with the antimicrobial pellets. Methods of injection molding are known in the art. A second processing method begins in block 368 and includes grinding the antimicrobial pellets to form a slush powder. In block 370 the method 350 then includes creating a molded product by subjecting the slush powder to slush molding. A third processing method begins in block 372 and includes processing the antimicrobial pellets by extruding, calendaring, or casting to create rolled goods or cast films as the antimicrobial material. The rolled goods or cast films can be processed by cutting and sewing and/or by thermoforming as discussed above.

When the antimicrobial material is a flexible and soft, such as when the antimicrobial material is a synthetic leather, as a non-limiting example, the method may also include disposing the antimicrobial film about a compressible foam substrate.

Methods for creating molding products depend on polymer type and an intended application. Slush molding requires desired particle sizes, whereas injection molding requires desired melt flow (as determined by a melt flow index (MFI)). Plasticized PVC with antimicrobial properties of the current technology are prepared using a dry blending/alloying technique, whereas antimicrobial TPU/TPO soft skin materials are prepared using twin-screw extrusion with defined screw profile followed by hydrogrinding to achieve desired particle size and bulk density. The end-product from these materials (e.g., PVC, TPU, and TPO) can be made using slush molding or thermoforming techniques.

A calendaring and/or cast film process is used to produce rolled goods/cast films/calendared rolls and these products are used for wrap up applications in automotive and aircraft interiors, furnishings, electronic housings, office furniture, and the like. The process of producing calendared goods begins with obtaining pellets from a primary process of extrusion compounding, i.e., plasticized PVC, TPU, TPO, PE, PP (or other polymers) are mixed with antimicrobial additives (e.g., graphene, graphene derivatives, metal oxides) in twin-screw extrusion to obtain pellets or calendared directly to form rolls/cast films. If pellets are obtained in extrusion process, they are fed into calendaring/cast film extruder to obtain rolled goods. The calendared goods/sheets are used, for example, in thermoforming or vacforming (thermoforming with vacuum) to produce a desired shape and application.

$Cu_2O$ is the source of $Cu^{1+}$ ions, ZnO is the source of $Zn^{2+}$, and AgO is the source of $Ag^{1+}$, which act as antimicrobials agent against H1N1, human corona viruses (including SARS-CoV-1 and SARS-CoV-2), and different species of bacteria and fungi. In regard to $Cu_2O$, the copper is not fully oxidized and remains active and very unstable. This instability allows the copper to remain highly reactive, which can lead to the formation of free radicles that can denature RNA and/or DNA cells within viruses with or without viral envelopes. The inactivation method is mediated by direct contact of copper on surfaces antimicrobial materials of the current technology. Graphene is used as an antimicrobial agent and for immobilizing the antimicrobial ions derived from the metal oxides, and increases the effectiveness of the antimicrobial materials against target viruses. The graphene can have 6-10 layers, which are exfoliated into single, double, and/or triple layers during twin extrusion with specially designed screws for improving dispersive and distributive mixing.

In one example, the antimicrobial material is a TPU skin material having 80-95 wt. % TPU resin, and 1-20 wt. % $Cu_2O$ immobilized in 0.05-10 wt. % graphene. Raw graphene powder used to make the TPU skin material can have a maximum of 10 layers. In another example, dry blended antimicrobial PVC includes 80-95 wt. % of plasticized PVC resin, and 1-20 wt. % of $Cu_2O$, immobilized in 0.05-10 wt. % graphene. Raw graphene powder used to make the dry blended antimicrobial PVC can have a maximum of 10 layers. In yet another example, an antimicrobial TPO skin material has 80-95 wt. % of TPO resin, and 1-20 wt. % of $Cu_2O$ immobilized in 0.05-10 wt. % graphene. An exemplary antimicrobial class-A materials (including, e.g., PP, TPO, and/or TPE) includes 70-95 wt. % of TPO resin, 5-20 wt. % talc, and 1-10 wt. percent of $Cu_2O$, immobilized in 0.05-10 wt. % graphene.

As discussed above, ZnO also has antimicrobial activity. There are a number of mechanisms by which Zn interferes with viral replication cycles. These mechanisms include free virus inactivation, inhibition of viral uncoating, viral genome transcription, and viral protein translation and polyprotein processing.

An example of an antiviral class-A material (including, e.g., PP, TPO, and/or TPE) includes 70-95 wt. % TPO resin, 5-20 wt. % talc, and 1-10 wt. % of ZnO. In another example, an antimicrobial TPU skin material has 80-95 wt. % of TPU resin, and 1-20 wt. % of zinc oxide immobilized in 0.05-10 wt. % graphene. Raw graphene powder used to make the antimicrobial TPU skin material can have a maximum of 10 layers. In yet another example, dry blended antimicrobial PVC includes 80-95 wt. % of plasticized PVC resin, and 1-20 wt. % of ZnO, immobilized in 0.05-10 wt. % graphene. Raw graphene powder used to make the dry blended antimicrobial PVC can have a maximum of 10 layers. An exemplary antimicrobial TPO skin material has 80-95 wt. % of TPO resin, and 1-20 wt. % of ZnO immobilized in 0.05-10 wt. % graphene The antiviral activity of the antimicrobial materials can be determined by exposure to SARS-Covid-2 for, e.g., about 15 minutes, about 30 minutes, about 45 minutes, about 1 hour, about 6 hours, about 12 hours, and about 24 hours, similar to what is provided by ISO 21702.

Embodiments of the present technology are further illustrated through the following non-limited example.

Example

Table 1 provides exemplary antimicrobial soft skin materials in accordance with various aspects of the current technology. The antimicrobial soft skin materials are prepared by adding all solid components into a Henschel mixer and mixing on low speed for 3 minutes for pre-heating purposes. After 3 minutes, 70% of polyol ester plasticizer is added into the mixer with stirring at low speed. The speed of the mixer is increased and material is mixed until a temperature of about 190° F. is reached. At 190° F., a remaining 30% of polyol ester plasticizer is added along with heat and light stabilizers with low speed mixing. A second plasticizer can also be added at this time. The mixer is then turned to high speed and mixed until it reaches a minimum temperature of 235° F. The material is then cooled to 120° F. where the drying agent is then added and an additional cooling period to about 105° F. allows for the addition of filler.

TABLE 1

Exemplary PVC-based antimicrobial soft skin materials.

| Dry Blends (PVC Formulations) | Parts by mass 1 | 2 |
|---|---|---|
| PVC suspension resin | 100 | 100 |
| Polyol Ester Plasticizer | 40-100 | 75-100 |
| Adipate Ester Plasticizer | 0 | 10 to 40 |
| Heat Stabilizer | 0.4 to 4 | 0.4 to 4 |
| Light Stabilizer | 0.4 to 1 | 0.4 to 1 |
| Epoxidized soy bean oil | 1 to 10 | 5 to 15 |
| PVC dispersion resin | 1 to 10 | 1 to 10 |
| Filler (CaCo3, Talc, etc.) | 1 to 10 | 1 to 10 |
| Graphene | 0 to 10 | 0 to 10 |
| Cuprous Oxide | 0 to 15 | 0 to 15 |
| Zinc Oxide | 0 to 10 | 0 to 10 |
| Graphene-Cuprous Oxide complex | 0 to 10 | 0 to 10 |

Table 2 provides exemplary antimicrobial soft skin materials in accordance with various aspects of the current technology. The antimicrobial soft skin materials are prepared by feeding graphene, TPU or TPO, and/or metal oxides into twin-screw extruder for melt blending followed by grinding to obtain a slush grade powder. Optional additives, such as light and UV stabilizers, compatibilizers, color pigments, and the like, may also be added. This formulation creates a high performance TPU or TPO with antiviral properties.

TABLE 2

Exemplary TPU- or TPO-based antimicrobial soft skin materials.

| Melt Blended Formulations (TPU & TPO) | Weight Percent 3 | 4 |
|---|---|---|
| Thermoplastic Polyurethane (TPU) | 80 to 95 | 0 |
| Thermoplastic Polyolefin (TPO)/Olefin-Block Copolymer (OBC) | 0 | 65 to 75 |
| Heat Stabilizer | 1 to 5 | 1 to 5 |
| Light Stabilizer | 1 to 5 | 1 to 5 |
| Compatibilizer | 0 to 5 | 0 to 5 |
| Graphene | 0 to 10 | 0 to 10 |
| Cuprous Oxide | 0 to 15 | 0 to 15 |
| Zinc Oxide | 0 to 10 | 0 to 10 |
| Graphene-Cuprous Oxide Complex | 0 to 10 | 0 to 10 |

Table 3 provides exemplary hard antimicrobial materials in accordance with various aspects of the current technology. The hard antimicrobial materials are prepared by feeding graphene, TPU and/or metal oxides into a twin-screw extruder for melt blending followed by grinding to obtain slush grade powder. Optional additives such as light and UV stabilizers, compatibilizers, color pigments, and the like may also be added. This formulation creates a high performance PP, TPO, ABS, PC, and PVC with antiviral properties.

TABLE 3

Exemplary PP-, TPO-, ABS-, PC-, and PVC-based hard antimicrobial materials.

| | Weight Percent | | | | |
|---|---|---|---|---|---|
| | 5 | 6 | 7 | 8 | 9 |
| Polypropylene (PP) | 65 to 95 | 0 | 0 | 0 | 0 |
| Thermoplastic Polyolefin (TPO)/Olefin Block Copolymer/Styrene-ethylene-butylene-styrene | 0 | 65 to 95 | 0 | 0 | 0 |
| Acrylonitrile butadiene styrene (ABS) | 0 | 0 | 65 to 95 | 0 to 20 | 0 |
| Polycarbonate (PC) | 0 | 0 | 0 | 65 to 95 | 0 |
| Polyvinyl Chloride (PVC) | 0 | 0 | 0 | 0 to 20 | 65 to 95 |
| Compatibilizer | 0 to 5 | 0 to 5 | 0 to 5 | 0 to 5 | 0 to 5 |
| Talc | 0 to 20 | 0 to 20 | 0 to 20 | 0 to 20 | 0 to 20 |
| Glass/Carbon Fiber | 0 to 20 | 0 to 20 | 0 to 20 | 0 to 20 | 0 to 20 |
| Graphene | 0 to 10 | 0 to 10 | 0 to 10 | 0 to 10 | 0 to 30 |
| Cuprous Oxide | 0 to 15 | 0 to 15 | 0 to 15 | 0 to 15 | 0 to 15 |
| Zinc Oxide | 0 to 10 | 0 to 10 | 0 to 10 | 0 to 10 | 0 to 10 |
| Graphene-Cuprous Oxide Complex | 0 to 10 | 0 to 10 | 0 to 10 | 0 to 10 | 0 to 10 |

Process for producing graphene-metal oxide complexes. Graphene-metal oxide complexes were prepared using a mechanical blending method. $Cu_2O$ and ZnO have respective particle sizes of about 100 μm and about 50 μm. Graphene black was separately uniformly mixed with $Cu_2O$ and ZnO in alcohol at weight ratios of about 1:10. Graphene/$Cu_2O$ and graphene/ZnO complexes were obtained following stirring for 6 h and drying in an oven at below 60° C. for 3 h.

Test material preparation. The CpK antiviral materials were provided as two material types. Type 1 was a soft pliable plastic material while Type 2 was a hard-plastic disk. In preparation for testing, the top and bottom of the CpK antiviral materials within sterile biosafety cabinet (BSC) were disinfected with 70% EtOH with a 5 min contact time. After sterilization, the materials were stored in sterile 100 mm polystyrene dishes. All of the materials were cut into ~0.5×0.5 cm squares and placed into sterile 1.5 ml tubes.

SARS-CoV-2 preparation and CpK Treatment. The SARS-CoV-2 virus stock at a titer of 105.8 infectious units (IU)/ml was diluted to 102.9 (IU)/ml. A volume of 850 μl of the diluted viral stock was added to a 1.5 ml tube containing the square of CpK antiviral material. The tube containing the virus and CpK antiviral material was placed on a tube rotator for 24 hrs at 220° C. with 100 μl samples collected at 1 hr, 3 hr, 6 hr, 12 hr, and 24 hrs. Viral supernatants from these time points were cultured in a standard TCID$_{50}$ experiment to measure reduction in viral titer. As a positive control, virus was added at the same concentration to the 1.5 ml tubes for 1 to 24 hrs. As a negative control and to determine material toxicity, media containing no virus was added to each of the materials for 1 to 24 hrs. Collected supernatants were diluted 100-fold to dilute any chemicals/materials that may have been released from the CpK antiviral material during incubation. The collected supernatants were further 100-fold diluted serially from 1:100 to 1:100000 and then added to 20,000 Vero E6 cells in 96 well flat bottom plates. The 1:100 dilution of the virus stock infecting 20,000 cells represents an MOI of 0.5. Infection of the Vero E6 cells was monitored by viral cytotoxicity. Cell toxicity of the supernatants derived material in the absence of virus (diluted 1:100) was measured visually. Results are shown in Table 4.

TABLE 4

Results of antiviral testing.

| Material Name | Time (hr) | Viral Titer | Reduction Factor (Log10) v. Control | % Viral Reduction |
|---|---|---|---|---|
| | 1 | 0 | >6 | 99.9% |
| | 3 | 0 | >6 | 99.9% |
| TPU-Graphene-Cu2O (Soft Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 0 | >6 | 99.9% |
| TPU-Graphene (Soft Plastic) | 6 | 0 | >6 | 99.9% |
| | 12 | 0 | >6 | 99.9% |
| | 24 | 0 | >6 | 99.9% |
| CLB5 | 1 | 10^2.8 | 0 | 0 |
| | 3 | 0 | >6 | 99.9% |
| PVC-Cu2O (Soft Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 0 | >6 | 99.9% |
| PVC-ZnO (Soft Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 10^2.8 | 0 | 0 |
| PVC-Graphene-Cu2OComplex (Soft Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 10^2.8 | 0 | 0 |
| PVC-CU2O10(Soft Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 10^2.8 | 0 | 0 |
| TPO-Cu2O (Hard Plastic) | 6 | 0 | >6 | 99.9% |
| | 12 | 0 | >6 | 99.9% |
| | 24 | 0 | >6 | 99.9% |
| | 1 | 10^2.8 | 0 | 0 |
| | 3 | 10^2.8 | 0 | 0 |
| TPO-Cu2O (Soft Plastic) | 6 | 10^2.8 | 0 | 0 |
| | 12 | 0 | >6 | 99.9% |
| | 24 | 0 | >6 | 99.9% |
| | 1 | 10^2.8 | 0 | 0 |
| | 3 | 10^2.8 | 0 | 0 |
| TPU-Graphene-Cu2O (Soft Plastic) | 6 | 10^2.8 | 0 | 0 |
| | 12 | 0 | >6 | 99.9% |
| | 24 | 0 | >6 | 99.9% |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making an antiviral material, the method comprising:

(a) combining polymer particles comprising at least one of: (i) a thermoplastic polyurethane (TPU), (ii) a thermoplastic polyolefin (TPO), (iii) thermoplastic vulcanizates (TPV), or combinations thereof, with graphene particles and metal oxide particles, the metal oxide particles comprising at least one of: (i) cuprous oxide ($Cu_2O$) particles, (ii) zinc oxide (ZnO) particles, or a combination thereof;

(b) dry blending together the polymer particles, the graphene particles, and the metal oxide particles to form a powder having a particle of selected particle sizes for slush molding; and (c) providing the formed powder having the particle as the antiviral material configured for use in a slush rotational molding process to form an antiviral flexible skin for a molded product.

2. The method of claim 1, further comprising separately combining the metal oxide particles, the polymeric particles and the graphene particles.

3. The method of claim 1, further comprising dispersing the graphene particles in a matrix including the polymer particles, with the graphene particles having a concentration of 0.05-10 wt. % based on a total weight of the antiviral material.

4. The method of claim 1, further comprising using the antiviral material to inactivate greater than or equal to 99% of viral particles in contact therewith in less than or equal to 1 hour.

5. The method of claim 1, wherein the polymer particles include the thermoplastic polyolefin, and the metal oxide particles include the cuprous oxide particles.

6. The method of claim 1, wherein the polymer particles include the thermoplastic polyurethane, and the metal oxide particles include the cuprous oxide particles.

7. The method of claim 1, wherein the polymer particles include the thermoplastic vulcanizates, and the metal oxide particles include the cuprous oxide particles.

8. The method of claim 1, wherein the polymer particles include the thermoplastic polyurethane, and the metal oxide particles include the zinc oxide particles.

9. The method of claim 1, further comprising:

including 50-98 wt. % of the polymer particles;

including 0.05-10 wt. % of the graphene particles;

including greater than 0 to 20 wt. % of the cuprous oxide particles and/or zinc oxide particles;

hydrogrinding the combined antiviral material; and drying the combined antiviral material in an oven.

10. The method of claim 1, wherein the molded product is an automotive vehicle instrument panel comprising foam between the antiviral skin and a rigid substrate.

11. The method of claim 1, wherein the molded product is part of an automotive vehicle component comprising: an A-pillar, a B-pillar, an airbag cover, a door trim panel, a center console, a knee bolster, a seat mechanism cover, or a sun visor.

12. The method of claim 1, wherein the molded product is a part of an automotive vehicle seat, a sitting bench, an exercise bench, a bicycle seat, a ski lift seat, or an airplane seat.

13. The method of claim 1, wherein the molded product is a floor covering or a counter top.

14. The method of claim 1, wherein the molded product is an exercise mat.

15. The method of claim 1, wherein the molded product is part of an electrical device.

16. The method of claim 1, wherein the product is part of a computer, a tablet, or a credit card machine.

17. The method of claim 1, wherein the molded product is an interior surface of an airplane cabin.

18. The method of claim 1, wherein the molded product is at least one component of a sports locker.

19. A method of making an antiviral material, the method comprising:
(a) combining polymer particles comprising at least one of: (i) a thermoplastic polyurethane (TPU), (ii) a thermoplastic polyolefin (TPO), (ii) thermoplastic vulcanizates (TPV), or combinations thereof, with graphene particles and metal oxide particles, the metal oxide particles comprising at least one of: (i) cuprous oxide ($Cu_2O$) particles, (ii) zinc oxide (ZnO) particles, or a combination thereof;
(b) blending all of the polymer particles, the graphene particles, and the metal oxide particles to form a blended mixture with formed particle sizes; and
(c) providing the blended mixture as the antiviral material, wherein the blended mixture with the formed particle sizes is configured for molding as an antiviral flexible skin for a molded product.

20. The method of claim 19, wherein the molding is rotational molding and the blended polymer particles, and graphene particles are a powder formed for the rotational molding.

21. The method of claim 19, further comprising dispersing the graphene particles in a matrix including the polymer particles, with the graphene particles having a concentration of 0.05-10 wt. % based on a total weight of the antiviral material.

22. The method of claim 19, further comprising using the antiviral material to inactivate greater than or equal to 99% of viral particles in contact therewith in less than or equal to 1 hour.

23. The method of claim 19, wherein the polymer particles include the thermoplastic polyolefin, and the metal oxide particles include the cuprous oxide particles.

24. The method of claim 19, wherein the polymer particles include the thermoplastic polyurethane, and the metal oxide particles include the cuprous oxide particles.

25. The method of claim 19, wherein the polymer particles include the thermoplastic vulcanizates, and the metal oxide particles include the cuprous oxide particles.

26. The method of claim 19, wherein the polymer particles include the thermoplastic polyurethane, and the metal oxide particles include the zinc oxide particles.

27. The method of claim 19, further comprising:
including 50-98 wt. % of the polymer particles;
including 0.05-10 wt. % of the graphene particles;
including greater than 0 to 20 wt. % of the cuprous oxide particles and/or zinc oxide particles;
hydrogrinding the combined antiviral material; and
drying the combined antiviral material in an oven.

28. The method of claim 19, wherein the molded product is an automotive vehicle instrument panel comprising foam between the antiviral skin and a rigid substrate.

29. The method of claim 19, wherein the molded product is part of an automotive vehicle component comprising: an A-pillar, a B-pillar, an airbag cover, a door trim panel, a center console, a knee bolster, a seat mechanism cover, or a sun visor.

30. The method of claim 19, wherein the molded product is a part of an automotive vehicle seat, a sitting bench, an exercise bench, a bicycle seat, a ski lift seat, or an airplane seat.

31. The method of claim 19, wherein the molded product is a floor covering or a counter top.

32. The method of claim 19, wherein the molded product is part of an electrical device.

33. The method of claim 19, wherein the molded product is an interior surface of an airplane cabin.

34. A method of making an antiviral material, the method comprising:
combining polymer particles, graphene particles, metal oxide particles; and
dry blending the combined polymer particles, graphene particles, and metal oxide particles to form a powder having a selected particle size configured for slush molding;
wherein the metal oxide particles comprise at least one of: cuprous oxide ($Cu_2O$) particles, zinc oxide (ZnO) particles, or a combination thereof;
wherein the graphene particles have at most 10 layers.

35. The method of claim 34, wherein the metal oxide particles, the polymeric material, and the graphene particles are combined separately.

36. The method of claim 34, wherein the graphene particles carry the metal oxide particles as graphene-metal oxide complex particles, wherein the graphene-metal oxide complex particles are formed by combining the graphene particles with the metal oxide particles, and wherein the metal oxide particles comprise at least one of: cuprous oxide ($Cu_2O$) particles, zinc oxide (ZnO) particles, or a combination thereof.

37. The method of claim 34, further comprising the drying blending to form the powder, and creating a molded product from the powder.

38. The method of claim 37, further comprising creating the molded product from the powder by slush molding.

39. The method of claim 34, further comprising:
melt compounding and extruding the polymer particles with the graphene particles to form an extruded material;
pelletizing the extruded material to form pellets; and
creating a molded product from the pellets.

40. The method of claim 39, wherein the creating the molded product from the pellets comprises performing injection molding with the pellets to form the molded product.

41. The method of claim 39, wherein the creating the molded product from the pellets comprises grinding the pellets to form a slush powder and performing slush molding with the slush powder to form the molded product.

42. The method of claim 34, further comprising processing the extruded material by calendaring or casting to form a rolled sheet or a cast film, configured for subsequent cutting and thermoforming.

43. The method of claim 39, wherein the molded product is flexible and the polymer comprises at least one of: polyvinyl chloride (PVC), a thermoplastic elastomer (TPE), or a combination thereof.

44. The method of claim 43, wherein the polymer includes TPE which comprises at least one of: a thermoplastic polyurethane (TPU), a thermoplastic polyolefin (TPO), thermoplastic vulcanizates (TPV), or combinations thereof; further comprising extruding the combined antiviral material, and hydrogrinding the extruded antiviral material.

45. The method of claim 34, further comprising molding a product from the antiviral material, which is rigid and the polymer comprising at least one of: polyvinyl chloride (PVC), polypropylene (PP), acrylonitrile butadiene styrene (ABS), polycarbonate (PC), PC/ABS, PC/PP, a thermoplastic elastomer (TPE), or combinations thereof.

46. The method of claim 34, further comprising molding an automotive vehicle component from the antiviral material, the component including: an instrument panel, an A-pillar, a B-pillar, an airbag cover, a door trim panel, a center console, a knee bolster, a seat mechanism cover, or a sun visor.

47. The method of claim 34, further comprising molding the antiviral material to form at least a portion of an automotive vehicle seat, a sitting bench, an exercise bench, a bicycle seat, a ski lift seat, an airplane seat, a floor covering, or a counter top.

48. The method of claim 38, wherein the antiviral material reduces a viral load by at least 99% in contact with the molded product formed from the powder.

* * * * *